United States Patent [19]

Jan et al.

[11] Patent Number: 4,521,591
[45] Date of Patent: Jun. 4, 1985

[54] OIL-SOLUBLE DISAZO DYES AND THEIR USE IN COLOR-PHOTOGRAPHIC RECORDING MATERIALS FOR THE SILVER DYE BLEACH PROCESS

[75] Inventors: Gérald Jan; John Lenoir, both of Fribourg, Switzerland

[73] Assignee: Ciba-Geigy AG, Basel, Switzerland

[21] Appl. No.: 346,785

[22] Filed: Feb. 8, 1982

[30] Foreign Application Priority Data

Feb. 20, 1981 [CH] Switzerland .................. 1145/81

[51] Int. Cl.³ .................. C09B 35/10; C09B 35/215; C09B 35/233; C09B 35/28
[52] U.S. Cl. .................................. 534/821; 430/225; 430/431; 430/563; 430/564; 534/689; 534/727; 534/819; 534/822; 534/823; 534/829; 534/831
[58] Field of Search ............. 260/174, 177, 178, 180, 260/181, 184, 186, 187; 534/821, 822, 823, 829, 831, 689, 819, 727

[56] References Cited

U.S. PATENT DOCUMENTS

| | | | |
|---|---|---|---|
| 2,010,512 | 8/1935 | Ebert | 260/178 X |
| 2,032,133 | 2/1936 | Krebser | 260/178 |
| 2,294,893 | 9/1942 | Carroll et al. | 260/181 X |
| 3,211,717 | 10/1965 | Thomas | 260/160 |
| 3,271,440 | 9/1966 | Thomas | 260/178 X |
| 3,421,829 | 1/1969 | Bennett et al. | 260/181 X |
| 3,538,075 | 11/1970 | Dehnert et al. | 260/184 |
| 3,657,218 | 4/1972 | Gnad | 260/175 |
| 3,992,142 | 11/1976 | Farre | 260/181 UX |
| 4,116,861 | 9/1978 | Aftergut et al. | 260/178 X |

FOREIGN PATENT DOCUMENTS

| | | | |
|---|---|---|---|
| 695348 | 8/1940 | Fed. Rep. of Germany | 260/178 |
| 2606560 | 8/1977 | Fed. Rep. of Germany | 260/178 X |
| 478227 | 1/1938 | United Kingdom | 260/178 |
| 1336673 | 11/1973 | United Kingdom | 260/178 |

Primary Examiner—Floyd D. Higel
Attorney, Agent, or Firm—Joseph G. Kolodny

[57] ABSTRACT

Compounds of the formula

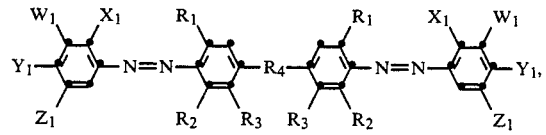

in which $X_1$ is hydrogen, alkyl, alkoxy, —$NL_1COM_1$, in which $L_1$ is hydrogen or alkyl and $M_1$ is alkyl or alkoxy, or is —$NL_1P(O)(OG_1)_2$, in which $G_1$ is alkyl, or is alkylsulfonamide or hydroxyl, $Y_1$ is hydrogen, alkyl, alkoxy, carbalkoxy, N-alkyl-substituted or N,N-dialkyl-substituted amino or —$NL_2COM_2$, in which $L_2$ is hydrogen or alkyl and $M_2$ is alkyl or alkoxy, $Z_1$ is hydrogen, alkyl, alkoxy, —$NL_2COM_3$, in which $M_3$ is alkyl, or is carbalkoxy or halogen or represents those atoms which are required to form a ring with $Y_1$, $W_1$ is hydrogen, alkyl or alkoxy, $R_1$ and $R_2$ independently of one another are hydrogen, halogen, cyano, nitro or —$SO_2U_3$, in which $U_3$ is alkyl or phenyl, $R_3$ is hydrogen or alkyl or, if $R_4$ is a direct chemical bond, the two radicals $R_3$ together are a link member and $R_4$ is a direct chemical bond or a link member, and at least two of the substituents $W_1$, $X_1$, $Y_1$ and $Z_1$ are other than hydrogen. The compounds can be used with particular advantage as image dyes, for example in photographic materials for the silver dye bleach process. Color images with excellent color reproduction are obtained.

4 Claims, No Drawings

OIL-SOLUBLE DISAZO DYES AND THEIR USE IN COLOR-PHOTOGRAPHIC RECORDING MATERIALS FOR THE SILVER DYE BLEACH PROCESS

The present invention relates to new, oil-soluble disazo dyes and their use in colour-photographic recording materials for the silver dye bleach process.

The use of water-soluble polyazo dyes or azoxy dyes for the silver dye bleach process is known (A. Meyer, J. Phot. Sci. 13, (1965), 90; Research Disclosure 17643/VII A, December 1978). On the one hand, the use of azo dyes of this type has advantages inasmuch as easy and homogeneous dyeing of the hydrophilic, colloidal binders of a photographic layer, in particular gelatine, is possible. Moreover, during the processing of exposed silver dye bleach materials, water-soluble scission products or azo dyes, which can readily be washed out, are formed in the exposed areas. However, amongst the disadvantages which arise when water-soluble azo dyes are used, the tendency of these dyes to diffuse within and between photographic layers should be mentioned in particular. To overcome this disadvantage, the use of reactive dyes has been proposed in the past. However, this entailed an unduly large effect on the rheological, chemical and mechanical properties of the photographic layer to be prepared. The use of higher-molecular water-soluble azo dyes also did not give a completely satisfactory result. Although the diffusion resistance is increased in this way, the tendency of such dyes to form micelles by aggregation represents a further disadvantage which significantly interferes with the colour density of the photographic image.

Swiss Patent Specification No. 600,385 now describes a silver dye bleach process in which water-insoluble azo dyes with masked auxochromes are dispersed in gelatine. These dyes, however, are bleached only slowly and sometimes incompletely. Moreover, the regeneration of the desired image dye requires a special treatment in a strongly alkaline medium. Other water-insoluble azo dyes which had been incorporated in silver dye bleach materials are accessible only with difficulty and their stability under changes in the pH value and under the action of light is unduly low (U.S. Pat. No. 3,544,326; Research Disclosure 14,983, September 1976).

It is thus the object of the present invention to provide new disazo dyes for use in colour-photographic recording materials for the silver dye bleach process, which dyes can readily be incorporated into the layers of the recording materials and which, due to their fastness properties, lead to a material which gives images of improved quality.

Oil-soluble disazo dyes for use in photographic layers of silver dye bleach materials have now been found, which impart the desired properties to the recording material and give photographic images of high quality.

The present invention therefore relates to compounds of the formula

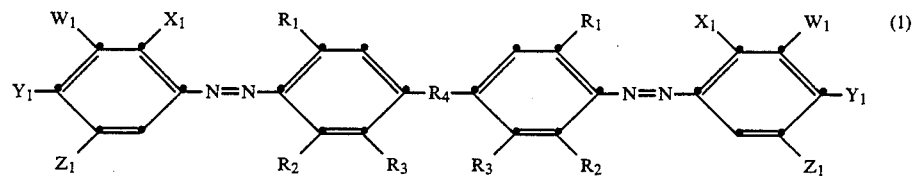

in which $X_1$ is hydrogen, alkyl or alkoxy each having 1 to 6 carbon atoms, or $-NL_1COM_1$, in which $L_1$ is hydrogen or alkyl having 1 to 4 carbon atoms and $M_1$ is alkyl or alkoxy, which have 1 to 20 carbon atoms and are unsubstituted or substituted by carbalkoxy having 2 to 5 carbon atoms or by alkoxy having 1 to 4 carbon atoms, or $X_1$ is $-NL_1P(O)(OG_1)_2$, in which $L_1$ is as defined above and $G_1$ is alkyl having 1 to 12 carbon atoms, or $X_1$ is alkylsulfonamide having 1 to 20 carbon atoms or hydroxyl, $Y_1$ is hydrogen, alkyl having 1 to 6 carbon atoms, alkoxy having 1 to 12 carbon atoms or $-(OC_2H_4)_{n1}-OU_1$, in which $U_1$ is hydrogen, alkyl having 1 to 6 carbon atoms or phenyl and $n_1$ is 1, 2 or 3, or $Y_1$ is N-alkyl-substituted or N,N-dialkyl-substituted amino, the alkyl moieties each containing 1 to 8 carbon atoms and being unsubstituted or substituted by electronegative groups, or $Y_1$ is $-NL_2COM_2$, in which $L_2$ is hydrogen or alkyl having 1 to 6 carbon atoms and $M_2$ is alkyl having 1 to 12 carbon atoms, alkoxy having 1 to 4 carbon atoms or $-O-(C_2H_4O)_{n1}-U_2$, in which $U_2$ is alkyl having 1 to 8 carbon atoms and $n_1$ is as defined above, $Z_1$ is hydrogen, alkyl having 1 to 12 carbon atoms or $-CH_2CO_2R_5$, in which $R_5$ is alkyl having 1 to 8 carbon atoms or $-(C_2H_4O)_{n1}-U_1$, in which $U_1$ and $n_1$ are as defined above, or $Z_1$ is alkoxy having 1 to 8 carbon atoms or $-(OC_2H_4)_{n1}-OU_1$ in which $U_1$ and $n_1$ are as defined above, or $Z_1$ is $-NL_2COM_3$, in which $L_2$ is as defined above and $M_3$ is alkyl having 1 to 18 carbon atoms, or $Z_1$ is carbalkoxy having 2 to 19 carbon atoms or $-CO(OC_2H_4)_{n1}-OU_1$, in which $U_1$ and $n_1$ are as defined above, or $Z_1$ is halogen or represents those atoms which are required in order to form, together with $Y_1$, a 5-membered or 6-membered, saturated or unsaturated ring which is unsubstituted or substituted by alkyl having 1 to 4 carbon atoms, $W_1$ is hydrogen, alkyl or alkoxy each having 1 to 4 carbon atoms, $R_1$ and $R_2$ independently of one another are hydrogen, halogen, cyano, nitro or $-SO_2U_3$, in which $U_3$ is alkyl having 1 to 6 carbon atoms, which is unsubstituted or substituted by hydroxyl or alkoxy having 1 to 6 carbon atoms, or is phenyl, $R_4$ is a direct chemical bond or a link member of the formula $-O-$, $-CO-$, $-SO_2-$, $-(CH_2)_{m1}-$, in which $m_1$ is an integer from 1 to 8, or $-CH=CH-$, and $R_3$ is hydrogen or alkyl having 1 to 12 carbon atoms or, if $R_4$ is a direct chemical bond, the two radicals $R_3$ together can be a link member of the formula $-CH_2-$ or $-CO-$, and at least two of the substituents $W_1$, $X_1$, $Y_1$ and $Z_1$ are other than hydrogen.

The invention also relates to the use of the compounds as image dyes in colour-photographic recording materials for the silver dye bleach process.

Moreover, the invention relates to a colour-photographic recording material for the silver dye bleach process, which material contains these compounds, to a process for the preparation of the compounds, and to the photographic images produced with the material.

The substituent $X_1$ in formula (1) is hydrogen, hydroxyl or alkyl having 1 to 6 carbon atoms. The alkyl radicals can be straight-chain or branched. Examples are methyl, ethyl, propyl, i-propyl, butyl, 3-methylpropyl, 1-methylpropyl, tert.-butyl, pentyl, 1,1-dimethylpropyl, 3,3-dimethylpropyl, hexyl, 4,4-dimethylbutyl and 1,3-dimethylbutyl.

Methyl and ethyl, in particular methyl, are the preferred alkyl radicals.

Hydroxyl is a very suitable radical.

An alkoxy radical $X_1$, having 1 to 6 carbon atoms, can be analogous to the alkyl radicals mentioned.

Methoxy and ethoxy, in particular methoxy, are the preferred alkoxy radicals.

$X_1$ can also be a radical of the formula $-NL_1COM_1$ in which $L_1$ is hydrogen or alkyl having 1 to 4 carbon atoms, for example methyl, ethyl, propyl, i-propyl, butyl, 1-methylpropyl, 3-methylbutyl or tert.-butyl. Methyl, ethyl and propyl are preferred alkyl radicals, methyl being especially suitable. Hydrogen is also a very suitable radical. $M_1$ is alkyl having 1 to 20 carbon atoms, and these alkyl radicals can be straight-chain or branched. Examples of such alkyl radicals are: methyl, ethyl, propyl, i-propyl, butyl, 1-methylpropyl, 3-methylpropyl, tert.-butyl, pentyl, 1,1-dimethylpropyl, 3,3-dimethylpropyl, hexyl, 1,1,3,3-tetramethylbutyl, 1-methylethylpentyl, 1-methylpentyl, neopentyl, 1-, 2- or 3-methylhexyl, heptyl, n-octyl, tert.-octyl, 2-ethylhexyl, n-nonyl, isononyl, tert.-nonyl, decyl tert.-decyl; undecyl, dodecyl, tetradecyl, hexadecyl, octadecyl or eicosyl as well as the respective isomers.

Alkyl radicals having 1 to 16 carbon atoms are preferred. Particularly suitable alkyl radicals having 1 to 8 carbon atoms. All the alkyl radicals mentioned can be substituted by carbalkoxy having 2 to 5 carbon atoms or by alkoxy having 1 to 4 carbon atoms, and the alkoxy moiety as well as the alkoxy radicals can be straight-chain or branched. $M_1$ can also be alkoxy having 1 to 20 carbon atoms. The alkoxy radicals can be analogous to the alkyl radicals mentioned, and they can be further substituted by carbalkoxy having 2 to 5 carbon atoms or by alkoxy having 1 to 4 carbon atoms.

$X_1$ can also be a radical of the formula $-NL_1P(O)(OG_1)_2$, in which $L_1$ is as defined above. $G_1$ is alkyl having 1 to 12, in particular 1 to 8, carbon atoms. Particularly suitable alkyl radicals contain 1 to 4 carbon atoms. Examples of possible alkyl radicals are given in the definitions of $M_1$.

In an alkylsulfonamide radical $X_1$, the alkyl moiety contains 1 to 20, in particular 1 to 16, carbon atoms. Preferably, the alkyl moiety has 1 to 12 carbon atoms. Examples of possible alkyl radicals are given in the definitions of $M_1$.

$Y_1$ is hydrogen or alkyl having 1 to 6, in particular 1 to 4, carbon atoms. Examples of suitable alkyl radicals are given in the definitions of $X_1$.

$Y_1$ can also be alkoxy having 1 to 12, in particular 1 to 8, carbon atoms. Possible alkoxy radicals are listed in the definitions of $M_1$.

In a radical $Y_1$ of the formula $-(OC_2H_4)_{n1}-OU_1$, $n_1$ is 1, 2 or 3, especially 1 or 2. $U_1$ is hydrogen, phenyl or alkyl having 1 to 6 carbon atoms. Examples of possible alkyl radicals are listed in the definitions of $X_1$.

In N-alkylsubstituted or N,N-dialkylsubstituted amino radicals $Y_1$, the alkyl radicals each contain 1 to 8 carbon atoms. Suitable alkyl radicals are those listed for $X_1$ and also heptyl, octyl and tert.-octyl. These alkyl radicals can be substituted by electronegative groups, for example methoxy, ethoxy, acetoxy, hydroxyl or cyano. Methoxy, ethoxy, hydroxyl and cyano are the preferred electronegative substituents. Methoxy and cyano are very particularly suitable.

Furthermore, $Y_1$ can be a radical of the formula $-NL_2COM_2$, in which $L_2$ is hydrogen or alkyl having 1 to 6 carbon atoms. Examples of suitable alkyl radicals are listed in the definitions of $X_1$. $M_2$ is alkyl having 1 to 12, in particular 1 to 6, carbon atoms. The definitions of $M_1$ contain suitable examples of possible alkyl radicals. $M_2$ can also be alkoxy having 1 to 4 carbon atoms, and this can be, for example, methoxy, ethoxy, propoxy, butoxy, tert.-butoxy, 1-methylpropoxy or 3-methylpropoxy. In an $M_2$ radical $-O(-C_2H_4O)_{n1}-U_2$, $n_1$ is as defined above. $U_2$ is alkyl having 1 to 8, in particular 1 to 4, carbon atoms. Suitable alkyl radicals are listed in the definitions of $M_1$. Methyl is a preferred alkyl radical.

$Z_1$ is hydrogen or alkyl having 1 to 12, in particular 1 to 8, carbon atoms. The definition of $M_1$ contains examples of suitable alkyl radicals.

Furthermore, $Z_1$ can be a radical of the formula $-CH_2CO_2R_5$, in which $R_5$ is alkyl having 1 to 8, in particular 1 to 4, carbon atoms. Examples are given in the definitions of $M_1$. $R_5$ can also be $-(C_2H_4O)_{n1}-U_1$, in which $U_1$ and $n_1$ are as defined above.

An alkoxy radical $Z_1$ contains 1 to 8, in particular 1 to 5, carbon atoms. Suitable alkoxy radicals can be found in the definitions of $M_1$.

$Z_1$ can also be a radical of the formula $-(OC_2H_4)_{n1}-OU_1$, in which $U_1$ and $n_1$ are as defined above.

$Z_1$ can be a radical of the formula $-NL_2COM_3$, in which $L_2$ is as defined above and $M_3$ is alkyl having 1 to 18, in particular 1 to 12, carbon atoms. Particularly suitable alkyl radicals contain 1 to 8 carbon atoms. The alkyl radicals can be those mentioned in the definitions of $M_1$.

$Z_1$ can be carbalkoxy having 2 to 19, in particular 2 to 12, carbon atoms, examples of the alkyl or alkoxy radicals being given in the definitions of $M_1$. Carbalkoxy having 2 to 5 carbon atoms is particularly preferred.

In a $Z_1$ radical $-CO(OC_2H_4)_{n1}-OU_1$, $U_1$ and $n_1$ are as defined above.

A halogen radical $Z_1$ is, for example, fluorine, chlorine or bromine, chlorine and bromine being preferred.

$Z_1$ can form, together with $Y_1$ and the carbon atoms to which $Z_1$ and $Y_1$ are bonded, 5-membered to 6-membered ring which can be saturated or unsaturated. This ring can be substituted by alkyl substituents having 1 to 4 carbon atoms, in particular methyl.

$W_1$ is hydrogen, or alkyl or alkoxy each having 1 to 4 carbon atoms, for example methyl, ethyl, propyl, butyl, and tert.-butyl or methoxy, ethoxy, propoxy, butoxy and tert.-butoxy. Methyl and methoxy are particularly suitable.

$R_1$ and $R_2$ independently of one another are hydrogen, halogen, for example chlorine or bromine, cyano, nitro or a radical of the formula $-SO_2U_3$. $U_3$ is alkyl having 1 to 6, in particular 1 to 4, carbon atoms. Suitable examples are listed in the definition of $X_1$. Methyl is particularly suitable. The alkyl radicals can be substituted further by hydroxyl or alkoxy having 1 to 6 carbon atoms. Possible alkoxy radicals are described in the definition of $X_1$. Methoxy is particularly preferred. $U_3$ can also be phenyl.

$R_3$ is hydrogen or alkyl having 1 to 12, in particular 1 to 8, carbon atoms. Alkyl radicals having 1 to 6 carbon atoms, preferably 1 to 4 carbon atoms, are particularly suitable. Useful alkyl radicals are methyl and ethyl. Further examples of suitable alkyl radicals are given in the definitions of $M_1$. The two radicals $R_3$ can form a link member of the formula —$CH_2$— or —CO—, if $R_4$ is a direct chemical bond.

$R_4$ is a direct chemical bond or a link member of the formula —O—, —CO—, —$SO_2$—, —$(CH_2)_{m1}$—, in which $m_1$ is an integer from 1 to 8, in particular 1 to 6, or is —CH=CH—.

—CO—, —$SO_2$—, —$CH_2$— and —CH=CH— are particularly suitable radicals $R_4$. The preferred link members are —CO— and —$SO_2$—.

At least two of the substituents $X_1$, $Y_1$, $Z_1$ and $W_1$ must be other than hydrogen.

Amongst the oil-soluble disazo dyes of the formula (1), those are preferred in which $X_1$ is alkyl or alkoxy each having 1 to 6 carbon atoms or —$NL_1COM_1$, in which $L_1$ is hydrogen or alkyl having 1 to 4 carbon atoms and $M_1$ is alkyl or alkoxy, which have 1 to 20 carbon atoms and are unsubstituted or substituted by carbalkoxy having 2 to 5 carbon atoms or by alkoxy having 1 to 4 carbon atoms, or $X_1$ is —$NL_1P(O)(OG_1)_2$, in which $L_1$ is as defined above and $G_1$ is alkyl having 1 to 12 carbon atoms, or $X_1$ is alkylsulfonamide having 1 to 20 carbon atoms or hydroxyl, $Z_1$ is alkyl having 1 to 12 carbon atoms or —$CH_2CO_2R_5$, in which $R_5$ is alkyl having 1 to 8 carbon atoms or —$(C_2H_4O)_{n1}$—$U_1$ in which $U_1$ and $n_1$ are as defined above, or $Z_1$ is alkoxy having 1 to 8 carbon atoms or —$(OC_2H_4)_{n1}$—$OU_1$, in which $U_1$ and $n_1$ are as defined above, or $Z_1$ is —$NL_2COM_3$, in which $L_2$ is as defined above and $M_3$ is alkyl having 1 to 18 carbon atoms, or $Z_1$ is carboalkoxy having 2 to 19 carbon atoms or —$CO(OC_2H_4)_{n1}$—$OU_1$, in which $U_1$ and $n_1$ are as defined above, or $Z_1$ is halogen or represents those atoms which are required in order to form, together with $Y_1$, a 5-membered or 6-membered, saturated or unsaturated ring which is unsubstituted or substituted by alkyl having 1 to 4 carbon atoms, and $Y_1$, $W_1$, $R_1$, $R_3$ and $R_4$ are as defined above, at least one of the substituents $R_1$, $R_2$ and $R_3$ being other than hydrogen, if $R_4$ is a direct chemical bond.

Preferred oil-soluble disazo dyes are those of the formula having 1 to 4 carbon atoms, alkoxy having 1 to 12 carbon atoms or —$(OC_2H_4)_{\overline{n}1}OU_{11}$, in which $U_{11}$ is hydrogen, alkyl having 1 to 4 carbon atoms or phenyl and $n_1$ is as defined above, or $Y_2$ is N-alkylsubstituted or N,N-dialkylsubstituted amino, the alkyl moieties each containing 1 to 8 carbon atoms and being unsubstituted or substituted by methoxy, ethoxy, acetoxy, hydroxyl or cyano, or $Y_2$ is —$NL_{21}COM_{21}$, in which $L_{21}$ is hydrogen or alkyl having 1 to 4 carbon atoms and $n_1$ is as defined above, $Z_2$ is hydrogen, alkyl having 1 to 8 carbon atoms or —$CH_2CO_2R_{51}$, in which $R_{51}$ is alkyl having 1 to 8 carbon atoms or —$(C_2H_4O)_{n1}$—$U_{11}$, in which $U_{11}$ and $n_1$ are as defined above, or $Z_2$ is alkoxy having 1 to 8 carbon atoms, —$(OC_2H_4)_{n1}$—$OU_{11}$, in which $U_{11}$ and $n_1$ are as defined above, or —$NL_{21}COM_{31}$, in which $L_{21}$ is as defined above and $M_{31}$ is alkyl having 1 to 12 carbon atoms, or $Z_2$ is carbalkoxy having 2 to 12 carbon atoms or —$CO(OC_2H_4)_{n1}$—$OU_{11}$, in which $U_{11}$ and $n_1$ are as defined above, or $Z_2$ is chlorine or bromine or represents those atoms which are required in order to form, together with $Y_2$, an unsubstituted or methyl-substituted, 6-membered, saturated ring which may contain 1 or 2 hetero-atoms, $W_2$ is hydrogen or methyl, $R_{11}$ and $R_{21}$ independently of one another are hydrogen, chlorine, bromine, cyano, nitro or —$SO_2U_{31}$, in which $U_{31}$ is alkyl having 1 to 4 carbon atoms, which is unsubstituted or substituted by hydroxyl or methoxy, or is phenyl, $R_{41}$ is a direct chemical bond or a link member of the formula —O—, —CO—, —$SO_2$—, —$(CH_2)_{m2}$—, in which $m_2$ is an integer from 1 to 6, or —CH=CH—, and $R_{31}$ is hydrogen or alkyl having 1 to 8 carbon atoms or, if $R_{41}$ is a direct chemical bond, the two radicals $R_{31}$ together can be a link member of the formula —$CH_2$— or —CO—, and at least one of the substituents $Y_2$, $Z_2$ and $W_2$ is other than hydrogen.

Suitable compounds of the formula (2) are those of the formula

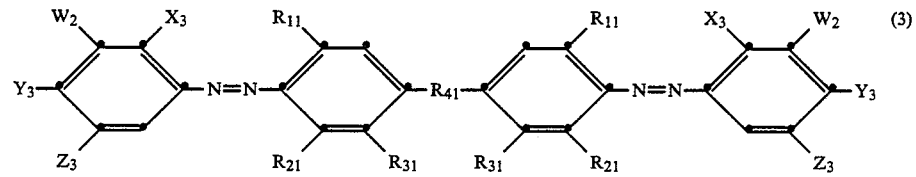

(3)

in which $X_3$ is methoxy or —$NHCOM_{12}$, in which $M_{12}$ is alkyl having 1 to 16 carbon atoms, which is unsubstituted or substituted by carbalkoxy having 2 to 5 carbon atoms or by methoxy or ethoxy, or $X_3$ is —$NHP(O)(OG_{12})_2$, in which $G_{12}$ is alkyl having 1 to 4 carbon atoms, or $X_3$ is alkylsulfonamide having 1 to 12 carbon atoms or hydroxyl, $Y_3$ is hydrogen, alkoxy having 1 to 12 carbon atoms or —$(OC_2H_4)_{n2}$—$OU_{12}$, in which $U_{12}$ is hydrogen or alkyl having 1 to 4 carbon atoms and $n_2$ is 1 or 2, or $Y_3$ is N-alkylsubstituted or N,N-dialkylsubstituted amino, the alkyl moieties each containing 1 to 8 carbon atoms and being unsubstituted or substituted by

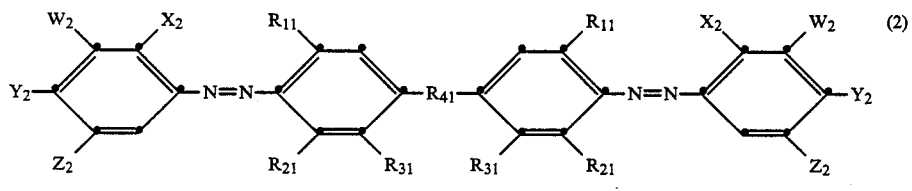

(2)

in which $X_2$ is methoxy or —$NL_{11}COM_{11}$, in which $L_{11}$ is hydrogen or methyl and $M_{11}$ is alkyl or alkoxy, which have 1 to 16 carbon atoms and are unsubstituted or substituted by carbalkoxy having 2 to 5 carbon atoms or by ethoxy or methoxy, or $X_2$ is —$NL_{11}P(O)(OG_{11})_2$, in which $L_{11}$ is as defined above and $G_{11}$ is alkyl having 1 to 8 carbon atoms, or $X_2$ is alkylsulfonamide having 1 to 16 carbon atoms or hydroxyl, $Y_2$ is hydrogen, alkyl methoxy, ethoxy, hydroxyl or cyano, or $Y_3$ is —NHCOM$_{22}$, in which $M_{22}$ is alkyl having 1 to 4 carbon atoms, methoxy or —O—(C$_2$H$_4$O)$_{n2}$—CH$_3$, in which $n_2$ is as defined above, $Z_3$ is hydrogen, alkyl having 1 to 8 carbon atoms or —CH$_2$CO$_2$R$_{52}$, in which R$_{52}$ is alkyl having 1 to 8 carbon atoms or —(C$_2$H$_4$O)$_{n2}$—U$_{12}$, in which $U_{12}$ and $n_2$ are as defined above, or $Z_3$ is alkoxy having 1 to 8 carbon atoms or —(OC$_2$H$_4$)$_{n2}$—OU$_{12}$, in which $U_{12}$ and $n_2$ are as defined above, or is —NL$_{21}$COM$_{32}$, in which $L_{21}$ is as defined above and $M_{32}$ is alkyl having 1 to 8 carbon atoms, or $Z_3$ is carbalkoxy having 2 to 5 carbon atoms or —CO(OC$_2$H$_4$)$_{n2}$—OU$_{11}$, in which $U_{11}$ and $n_2$ are as defined above, and $W_2$, $R_{11}$, $R_{21}$, $R_{31}$ and $R_{41}$ are as defined above, and at least one of the substituents $Y_3$, $Z_3$ and $W_2$ is other than hydrogen.

Those compounds are also preferred which are of the formula

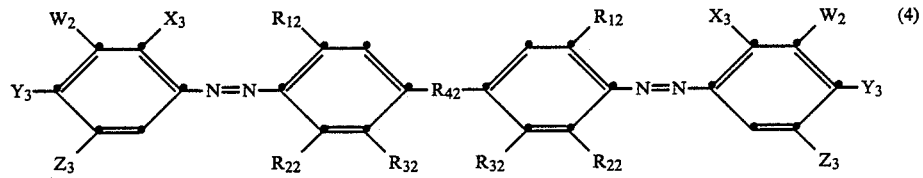

in which $R_{12}$ and $R_{22}$ independently of one another are hydrogen, chlorine, bromine, cyano, nitro or methylsulfone, $R_{42}$ is a direct chemical bond or a link member of the formula —O—, —CO—, —SO$_2$—, —(CH$_2$)$_{m2}$—, in which $m_2$ is as defined above, or —CH=CH—, $R_{32}$ is hydrogen or alkyl having 1 to 4 carbon atoms or, if $R_{42}$ is a direct chemical bond, the two radicals $R_{32}$ can be a link member of the formula —CH$_2$— or —CO—, and $X_3$, $Y_3$, $Z_3$ and $W_2$ is other than hydrogen.

Of interest are compounds of the formula

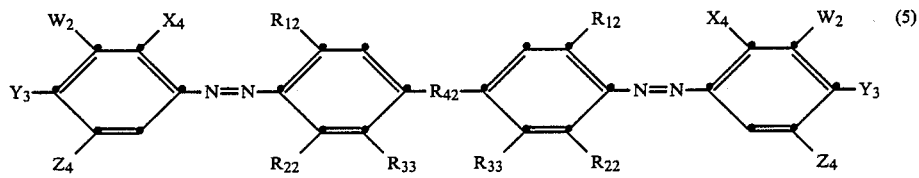

in which $X_4$ is —NHCOM$_{12}$ or —NHP(O)(OG$_{12}$)$_2$, in which $M_{12}$ and $G_{12}$ are as defined above, or is hydroxyl, $Z_4$ is hydrogen, alkyl or alkoxy having 1 to 8 carbon atoms or —CH$_2$CO$_2$R$_{53}$, in which R$_{53}$ is alkyl having 1 to 4 carbon atoms, —(C$_2$H$_4$O)$_2$—CH$_3$ or —C$_2$H$_4$O—CH$_3$, or $Z_4$ is —(OC$_2$H$_4$)$_{n2}$—OU$_{12}$ or —NL$_{21}$COM$_{32}$, in which $U_{12}$, $n_2$, $L_{21}$ and $M_{32}$ are as defined above, $R_{33}$ is hydrogen or methyl or, if $R_{42}$ is a direct chemical bond, the two radicals $R_{33}$ together can be a link member of the formula —CH$_2$— or —CO—, and $W_2$, $Y_3$, $R_{12}$, $R_{22}$ and $R_{42}$ are as defined above, and at least one of the substituents $W_2$, $Y_3$ and $Z_4$ is other than hydrogen.

Valuable compounds of the formula (5) are then those of the formula

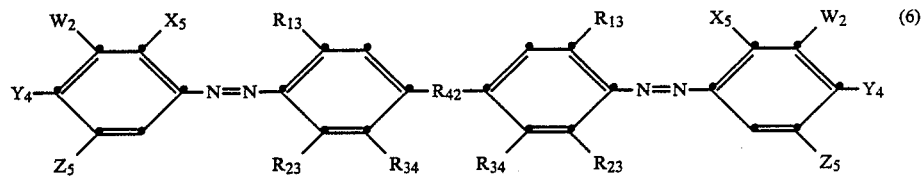

in which $X_5$ is —NHCOM$_{13}$, in which $M_{13}$ is alkyl having 1 to 16 carbon atoms, or —NHP(O)(OG$_{12}$)$_2$, in which $G_{12}$ is as defined above, or is hydroxyl, $Y_4$ is hydrogen, alkoxy having 1 to 8 carbon atoms or —(OC$_2$H$_4$)$_{n2}$—OU$_{13}$, in which $U_{13}$ is methyl or ethyl and $n_2$ is as defined above, or $Y_4$ is N-alkylsubstituted or N,N-dialkylsubstituted amino, the alkyl moieties each containing 1 to 8 carbon atoms and being unsubstituted or substituted by methoxy, ethoxy, hydroxyl or cyano, $Z_5$ is hydrogen, alkyl or alkoxy having 1 to 5 carbon atoms or —CH$_2$CO$_2$R$_{53}$, in which R$_{53}$ is as defined above, or $Z_5$ is —(OC$_2$H$_4$)$_2$—OCH$_3$, —(OC$_2$H$_4$)$_2$—OH, —OC$_2$H$_4$—OH, —OC$_2$H$_4$—OCH$_3$ or —N(CH$_3$)COM$_{32}$, in which $M_{32}$ is as defined above, $R_{13}$ and $R_{23}$ independently of one another are hydrogen, chlorine, bromine, cyano, nitro or methylsulfone, $R_{34}$ is hydrogen or methyl or, if $R_{42}$ is a direct chemical bond, the two radicals $R_{34}$ together can be a link member of the formula —CH$_2$— or —CO—, and $W_2$ and $R_{42}$ are as defined above, and at least one of the substituents $W_2$, $Y_4$ and $Z_5$ is other than hydrogen.

Particularly interesting compounds of the formula (6) are those of the formula

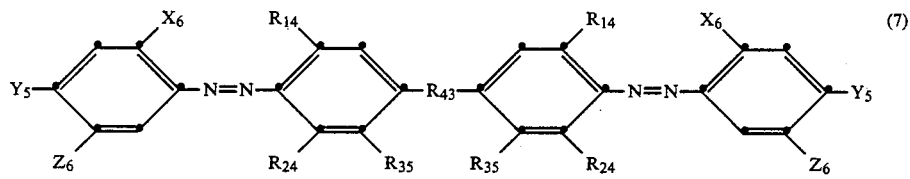

(7)

in which $X_6$ is —NHCOM$_{13}$ or —NHP(O)(OG$_{12}$)$_2$, in which M$_{13}$ and G$_{12}$ are as defined above, Y$_5$ is N-alkylsubstituted or N,N-dialkylsubstituted amino, the alkyl moieties each containing 1 to 8 carbon atoms and being unsubstituted or substituted by methoxy or ethoxy, Z$_6$ is hydrogen, alkoxy having 1 to 5 carbon atoms, ─(OC$_2$H$_4$)$_2$—OCH$_3$, ─(OC$_2$H$_4$)$_2$—OH, —OC$_2$H$_4$OCH$_3$ or —OC$_2$H$_4$—OH, R$_{14}$ and R$_{24}$ independently of one another are hydrogen, chlorine or bromine, R$_{35}$ is hydrogen or, if R$_{43}$ is a direct chemical bond, the two radicals R$_{35}$ together can be a link member of the formula —CH$_2$— or —CO—, and R$_{43}$ is a direct chemical bond or a link member of the formula —CO—, —SO$_2$— or —CH=CH—.

Particularly valuable compounds of the formula (6) are those of the formula

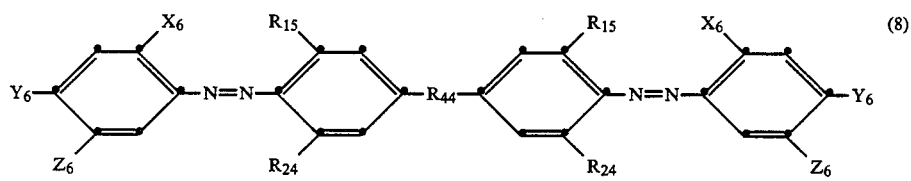

(8)

in which Y$_6$ is N,N-dialkylsubstituted amino, the alkyl moieties each containing 1 to 8 carbon atoms and being unsubstituted or substituted by methoxy, ethoxy or cyano, R$_{15}$ and R$_{24}$ independently of one another are cyano, nitro or methylsulfone, R$_{44}$ is a direct chemical bond or a link member of the formula —CO— or —SO$_2$— and X$_6$ and Z$_6$ are as defined above.

Particularly preferred compounds of the formula (6) are those of the formula

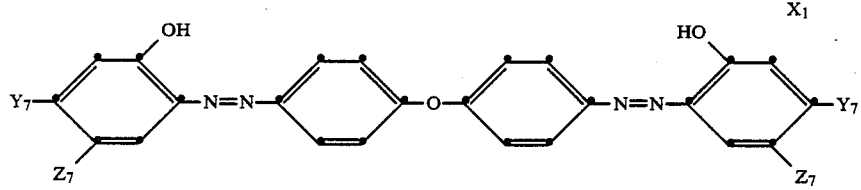

in which Y$_7$ is alkoxy having 1 to 8 carbon atoms or ─(OC$_2$H$_4$)$_{n2}$—OU$_{13}$, in which n$_2$ and U$_{13}$ are as defined above, and Z$_7$ is hydrogen or alkyl having 1 to 5 carbon atoms.

Particularly preferred compounds of the formula (9) are those of the formula

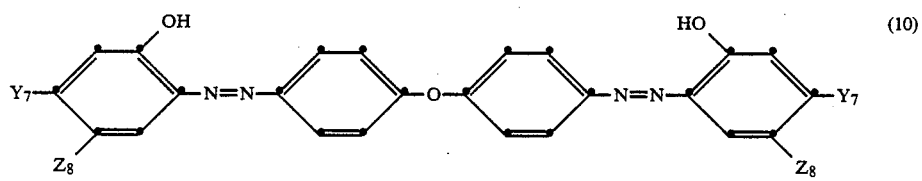

in which Z$_8$ is alkyl having 1 to 3 carbon atoms and Y$_7$ is as defined above.

Due to their insolubility in water, the dyes can be obtained in a very pure form. They are prepared by conventional methods, for example by tetrazotising an amine of the formula

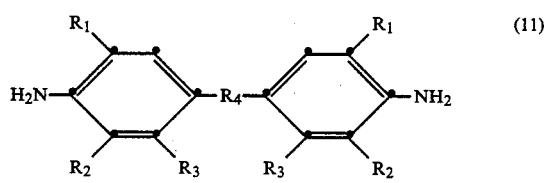

in which R$_1$, R$_2$, R$_3$ and R$_4$ are as defined above, in the conventional manner in the presence or absence of an organic solvent and coupling the product with a coupling component of the formula

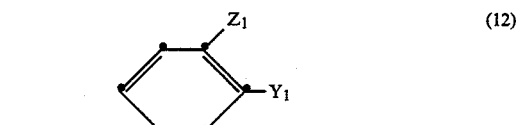

in which X$_1$, Y$_1$, Z$_1$ and W$_1$ are as defined above, in the presence or absence of an organic solvent and in the presence or absence of a base.

When preparing disazo dyes of the formula (1) in which the substituents $R_1$ and $R_2$ are cyano, it is advantageous to introduce the cyano group by an exchange reaction with the corresponding halogenated compound.

If $R_1$ and $R_2$ in the formula (1) are alkylsulfone, it is likewise possible to prepare the corresponding azo compounds from the halogenated compound by reacting the latter with a suitable sulfinate, optionally in the presence of $Cu^+$.

The compounds listed in Table 1 can, for example, be used as the amines of the formula (11).

TABLE 1

Structure:

$H_2N$—[benzene ring with $R_1$ top, $R_2$ bottom]—$R_4$—[benzene ring with $R_1$ top, $R_2$ bottom]—$NH_2$ (with $R_3$ substituents)

| $R_1$ | $R_2$ | $R_3$ | $R_4$ |
|---|---|---|---|
| H | H | H | $>O$ |
| H | H | H | $>SO_2$ |
| H | H | H | $>C=O$ |
| H | H | H | $-CH_2-$ |
| H | H | H | $-CH_2-CH_2-$ |
| H | H | H | $-CH_2CH_2CH_2-$ |
| H | H | H | $-CH_2CH_2CH_2CH_2-$ |
| H | H | H | $-CH=CH-$ |
| H | H | H | $>N-CH_3$ |
| H | H | H | $>NCOCH_3$ |
| H | H | H | $>NCOC_2H_5$ |
| H | H | H | $>NCOC_3H_7$ |
| H | H | H | $>NCOC_4H_9$ |
| H | H | H | $>NCOC_5H_{11}$ |
| H | H | H | $>NCOC_6H_{13}$ |
| Br | Br | H | $>SO_2$ |
| Br | Br | H | $>C=O$ |
| Br | Br | H | $>CH_2$ |
| Br | Br | H | $-(CH_2)_2-$ |
| Br | Br | $CH_3$ | $-(CH_2)_2-$ |
| Br | Br | H | $-(CH_2)_3-$ |
| Br | Br | H | $-(CH_2)_4-$ |
| Br | $NO_2$ | H | $>SO_2$ |
| Br | $NO_2$ | H | $>C=O$ |
| $NO_2$ | $NO_2$ | H | $>SO_2$ |
| $NO_2$ | $NO_2$ | H | $>C=O$ |
| CN | CN | H | $>SO_2$ |
| CN | CN | H | $>C=O$ |
| Br | Br | H | — |
| Br | $NO_2$ | H | — |
| Br | $NO_2$ | H | $-CH_2-$ |
| Br | $NO_2$ | H | $-(CH_2)_2-$ |
| CN | $NO_2$ | H | $>SO_2$ |

TABLE 1-continued

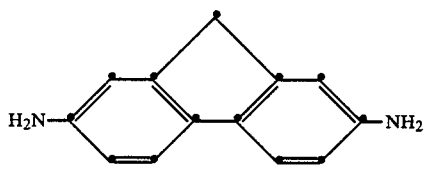

| R₁ | R₂ | R₃ | R₄ |
|---|---|---|---|
| CN | NO₂ | H | $\diagdown$C=O |
| NO₂ | NO₂ | H | — |
| CN | CN | H | — |
| CN | CN | H | —CH₂— |
| CN | CN | H | —(CH₂)₂— |
| CN | NO₂ | H | —CH₂— |
| CN | NO₂ | H | —(CH₂)₂— |
| SO₂CH₃ | NO₂ | H | $\diagdown$SO₂ |
| SO₂CH₃ | NO₂ | H | $\diagdown$C=O |

Further suitable diamines which can be tetrazotised are of the formulae:

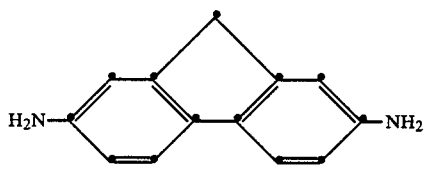

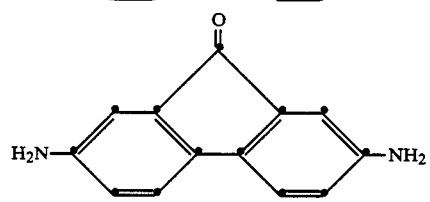

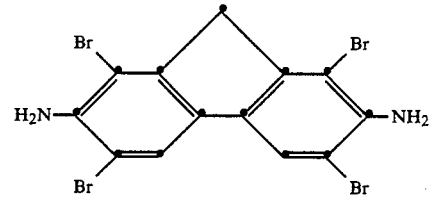

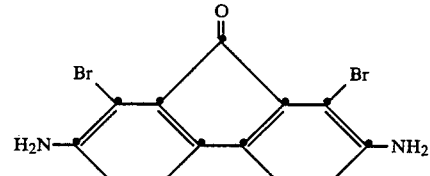

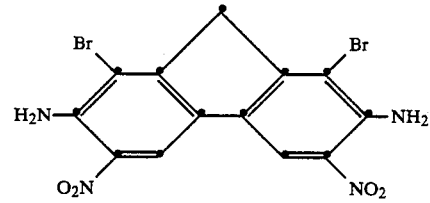

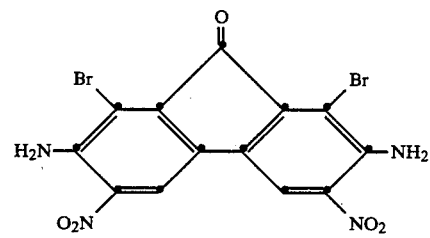

Examples of suitable coupling components are compiled in Table 2.

TABLE 2

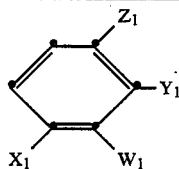
(12)

| X₁ | Y₁ | Z₁ | W₁ |
|---|---|---|---|
| OCH₃ | N(C₄H₉)₂ | H | H |
| OH | N(C₄H₉)₂ | H | H |
| NHCOCH₃ | N(C₄H₉)₂ | H | H |
| NHCOC₂H₅ | N(C₃H₇)₂ | H | H |
| NHCOC₄H₉ | N(C₃H₇)₂ | H | H |
| NHCOCH₂CH(CH₃)₂ | N(C₂H₅)₂ | H | H |
| NHCOCH₂CH(CH₃)₂ | 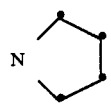 | OCH₃ | H |

TABLE 2-continued (12)

Structure: benzene ring with $Z_1$, $Y_1$, $W_1$, $X_1$ substituents.

| $X_1$ | $Y_1$ | $Z_1$ | $W_1$ |
|---|---|---|---|
| NHCOCH$_3$ | N(C$_2$H$_5$)$_2$ | OCH$_3$ | H |
| NHCOCH$_2$CH(CH$_3$)$_2$ | N(C$_2$H$_5$)$_2$ | OCH$_3$ | H |
| NHCOCH$_2$CH(CH$_3$)$_2$ | N(C$_4$H$_9$)$_2$ | OCH$_3$ | H |
| NHCOCH$_2$CH(CH$_3$)$_2$ | N(C$_6$H$_{13}$)$_2$ | H | H |
| NHCOCH$_2$CH(CH$_3$)$_2$ | N(C$_6$H$_{13}$)$_2$ | OCH$_3$ | H |
| NHCOCH$_2$CH(CH$_3$)$_2$ | N(C$_4$H$_9$)$_2$ | OCH$_3$ | H |
| NHCOCH$_2$CH(CH$_3$)$_2$ | NHCH(CH$_3$)CH$_2$OCH$_3$ | OCH$_3$ | H |
| NHCO CH(CH$_3$)$_2$ | NHCH(CH$_3$)CH$_2$OCH$_3$ | OCH$_3$ | H |
| NHCOCH$_3$ | N(C$_2$H$_5$)C$_2$H$_4$CN | OCH$_3$ | H |
| NHCOC$_2$H$_5$ | N(C$_2$H$_5$)$_2$ | OC$_2$H$_4$OCH$_3$ | H |
| NHCOC$_3$H$_7$ | N(C$_2$H$_5$)$_2$ | OCH$_3$ | H |
| NHCOCH$_3$ | N(C$_4$H$_9$)$_2$ | OC$_2$H$_4$OCH$_3$ | H |
| NHCOCH(C$_2$H$_5$)C$_4$H$_9$ | N(C$_2$H$_5$)$_2$ | OCH$_3$ | H |
| NHCOCH(C$_{12}$H$_{25}$)OC$_6$H$_4$—C$_5$H$_{11}$ | N(C$_2$H$_5$)$_2$ | OCH$_3$ | H |
| NHCO$_2$C$_2$H$_4$OCH$_2$CH(CH$_3$)$_2$ | N(C$_2$H$_5$)$_2$ | OCH$_3$ | H |
| NHCO$_2$C$_2$H$_4$OCH$_2$CH(CH$_3$)$_2$ | NHCH(CH$_3$)CH$_2$OCH$_3$ | OCH$_3$ | H |
| OCH$_3$ | N(C$_4$H$_9$)$_2$ | OCH$_3$ | H |
| NHCOCH$_2$CH(CH$_3$)$_2$ | N(C$_2$H$_5$)$_2$ | OC$_2$H$_4$OCH$_3$ | H |
| NHCOCH$_2$CH(CH$_3$)$_2$ | N(C$_2$H$_5$)$_2$ | OC$_2$H$_5$ | H |
| NHCOC$_3$H$_7$ | N(C$_2$H$_5$)$_2$ | OC$_4$H$_9$ | H |
| NHCOCH$_2$CH(CH$_3$)$_2$ | NHC$_2$H$_4$CN | H | H |
| NHCOC$_{11}$H$_{23}$ | NHC$_2$H$_4$CN | H | H |
| NHP(O)(OC$_4$H$_9$)$_2$ | NHC$_2$H$_4$CN | H | H |
| NHP(O)(OC$_2$H$_5$)$_2$ | NHCH(CH$_3$)CH$_2$OCH$_3$ | OCH$_3$ | H |
| NHP(O)(OCH$_3$)$_2$ | N(C$_4$H$_9$)$_2$ | OCH$_3$ | H |
| NHP(O)(OC$_2$H$_5$)$_2$ | N(C$_2$H$_5$)$_2$ | H | H |
| NHP(O)(OC$_4$H$_9$)$_2$ | N(C$_2$H$_5$)$_2$ | OCH$_3$ | H |
| NHP(O)(OC$_2$H$_5$)$_2$ | N(C$_2$H$_5$)$_2$ | OCH$_3$ | H |
| NHP(O)(OC$_2$H$_4$OC$_2$H$_5$)$_2$ | N(C$_2$H$_5$)$_2$ | OCH$_3$ | H |
| NHP(O)(OC$_4$H$_9$)$_2$ | NHCH(CH$_3$)CH$_2$OCH$_3$ | OCH$_3$ | H |
| NHP(O)(OC$_4$H$_9$)$_2$ | NHCH(CH$_3$)CH$_2$OCH$_3$ | OC$_2$H$_4$OCH$_3$ | H |
| NHP(O)[OCH$_2$CH(CH$_3$)$_2$]$_2$ | NHCH(CH$_3$)CH$_2$CH(CH$_3$)$_2$ | OCH$_3$ | H |
| NHP(O)(OC$_2$H$_5$)$_2$ | NHCH(CH$_3$)CH$_2$OCH$_3$ | OC$_2$H$_4$OCH$_3$ | H |
| NHCOCH$_2$CH(CH$_3$)$_2$ | N(C$_2$H$_5$)$_2$ | O(C$_2$H$_4$O)$_2$CH$_3$ | H |
| OH | H | C$_5$H$_{11}$ | H |
| OH | H | C$_5$H$_{11}$ | C$_5$H$_{11}$ |
| OH | H | CO$_2$CH$_2$CH(CH$_3$)$_2$ | H |
| OH | H | CO$_2$(C$_2$H$_4$O)CH$_3$ | H |
| OH | H | CH$_2$CO$_2$CH$_2$CH(CH$_3$)$_2$ | H |
| OH | H | OCH$_2$CH(CH$_3$)$_2$ | H |
| OH | H | O(C$_2$H$_4$O)$_2$CH$_3$ | H |
| OH | H | CH$_2$CO$_2$(C$_2$H$_4$O)$_2$CH$_3$ | H |
| OH | H | NHCOCH(C$_2$H$_5$)C$_4$H$_9$ | H |
| OH | H | NCH$_3$COCH(C$_2$H$_5$)C$_4$H$_9$ | H |
| OH | H | O(C$_2$H$_4$O)$_2$CH$_3$ | H |
| OH | OH | CO$_2$CH$_2$CH(CH$_3$)$_2$ | H |
| OH | H | OH | OC$_3$H$_7$ |
| OH | NHCOCH$_3$ | OCH$_3$ | H |
| OH | NHC$_2$H$_4$CN | H | H |
| OH | NHC$_2$H$_5$CN | OCH$_3$ | H |
| OH | NHCOCH$_2$CH(CH$_3$)$_2$ | OCH$_3$ | H |
| OH | NHCO$_2$(C$_2$H$_4$O)$_2$CH$_3$ | OCH$_3$ | H |
| OH | N(C$_2$H$_4$CN)COCH$_3$ | OCH$_3$ | H |
| OH | OCH$_3$ | OCH$_3$ | H |
| OH | OC$_2$H$_5$ | OC$_2$H$_5$ | H |
| OH | NHC$_3$H$_7$ | H | H |
| OH | NHC$_3$H$_7$ | OCH$_3$ | H |
| OH | N(C$_3$H$_7$)$_2$ | OCH$_3$ | H |
| OH | N(C$_4$H$_9$)COCH$_3$ | OCH$_3$ | H |
| OH | NHCOCH(C$_2$H$_5$)C$_4$H$_9$ | OCH$_3$ | H |
| OH | NHCOCH(C$_2$H$_5$)C$_4$H$_9$ | CH$_3$ | H |
| OH | OC$_2$H$_4$OC$_4$H$_9$ | CH$_3$ | H |
| OH | O(C$_2$H$_4$O)$_2$CH$_3$ | CH$_3$ | H |
| OH | O(C$_2$H$_4$O)$_2$CH$_3$ | H | H |
| OH | OCH$_3$ | NHCOCH$_2$CH(CH$_3$)$_2$ | H |
| OH | OCH$_2$CH$_2$CH(CH$_3$)$_2$ | CH$_3$ | H |
| NHCOC$_2$H$_4$OC$_2$H$_5$ | N(C$_2$H$_5$)$_2$ | OCH$_3$ | H |
| NHCOC$_2$H$_4$OC$_4$H$_9$ | N(C$_2$H$_5$)$_2$ | OCH$_3$ | H |
| HNCOC$_2$H$_4$OC$_2$H$_5$ | N(C$_2$H$_5$)$_2$ | OC$_2$H$_4$OCH$_3$ | H |

TABLE 2-continued

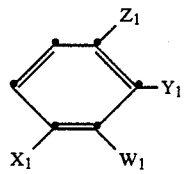
(12)

| $X_1$ | $Y_1$ | $Z_1$ | $W_1$ |
|---|---|---|---|
| NHCOC$_2$H$_4$OC$_4$H$_9$ | N(C$_2$H$_5$)$_2$ | OC$_2$H$_4$OCH$_3$ | H |

The oil-soluble disazo dyes of the formula (1) can be used for various purposes, but in particular in photographic materials and, in this case, with particular advantage as image dyes for the silver dye bleach process. Accordingly, valuable photographic materials, in particular silver dye bleach materials, can be prepared in a conventional manner known per se, which materials contain, on a base, at least one dye of the formula (1) dissolved in oil, in at least one silver halide emulsion layer or in a colloid layer adjacent to the silver halide emulsion layer.

The compounds of the formulae (1) to (10) dissolved in oil, show several advantages.

Thus, they are distinguished by the high stability of their emulsions. A tendency to form micelles is completely absent, so that there is no adverse influence on the colour density of the photographic images.

The oil acts not only as a solvent for dyes, but it can at the same time be a plasticiser for the gelatine. The possible detachment, which can occur especially under moist conditions, of the photographic layers from the material of the base is thus largely prevented.

As a result of the good solubility of the dyes in oil, a large capacity for taking dye in an oil droplet can be achieved. Thus, it is possible to coat photographic materials having very thin layers. This has an advantageous effect on the sharpness of the images.

As the base for the silver halide emulsion layers, a material can be used which is transparent, has a metallic reflection or preferably is white-opaque and which preferably is unable to absorb liquid from the baths.

For example, the base can consist of pigmented or unpigmented cellulose triacetate or polyester. If it consists of paper felt, the latter must, on both sides, be lacquered or coated with polyethylene. The light-sensitive layers are located on at least one side of this base, preferably in the known arrangement, i.e. a red-sensitised silver halide emulsion layer containing a cyan azo dye at the bottom, on top of this a green-sensitised silver halide emulsion layer containing a magenta azo dye and, at the top, a blue-sensitive silver halide emulsion layer containing a yellow azo dye. The material can also contain subbing layers, interlayers, filter layers and protective layers, but the total thickness of the layers should in general not exceed 20 μm.

The dyes according to the invention are lipophilic and are in general incorporated into the gelatine as solutions in high-boiling solvents. In most cases, it suffices to add the dyes, which are to be used, as a solution in such a solvent, if necessary with the aid of a highly volatile auxiliary solvent, at normal or slightly elevated temperature to an aqueous gelatine solution, with thorough stirring. Subsequently, the mixture and gelatine containing silver halide and/or materials for the production of photographic images are brought together, and the whole is coated on a base in the conventional manner to give a layer and, optionally, is dried.

Disazo dyes of the formula (1) dissolved in organic solvents can be added directly to a gelatine containing silver halide and/or other materials for the production of photographic images. It is thus possible, for example, that the dye solution is mixed in only just before coating.

In place of simple stirring, the conventional distribution methods by means of kneading forces and/or shear forces or ultrasonics can also be used.

It is also possible to add the dye not as a solution but in the solid form as a fine suspension. Furthermore, it is possible to incorporate the dyes into the gelatine in the presence of high-molecular polymers. Latices are of particular interest for this application.

The coating solution can also contain further additives, such as hardeners, complexing agents and wetting agents as well as sensitisers and stabilisers for the silver halide.

The disazo dyes do not undergo any chemical reactions with the light-sensitive materials. The dyes of the formula (1) are highly resistant to diffusion, since they form stable organic solutions. They are insensitive to calcium ions and can readily be bleached to white.

When added to the coating solutions, the disazo dyes do not cause any rise in viscosity or a significant change in viscosity, when the coating mixture is left to stand.

The spectral absorptions in gelatine are such that, depending on the structure, the dyes of the formula (1) can be combined to give a dye tripack which is assembled from one yellow dye, one magenta dye and one cyan dye and which, over the entire density range, has grey shades which appear neutral to the eye.

The photographic silver dye bleach material prepared using disazo dyes of the formula (1) is distinguished in particular by brilliant colours, good colour reproduction and excellent light fastness. An important feature of a good colour-copying material is optimum reproduction of shades and colour gradations which are balanced in all density ranges. Particularly the control of colour balance causes difficulties again and again, since the different behaviour of the azo dyes during bleaching cannot always be balanced by the conventional methods of assembling the material, such as matching the sensitivity and contrast of the silver halide emulsion used. In many cases, this restricts the selection of the image dyes and, in particular, also the selection of the processing components in the bleach bath.

The processing of the exposed silver dye bleach material is in general carried out in four successive steps:
1. Silver development
2. Dye bleaching
3. Silver bleaching
4. Fixing.

In the first step, the latent silver image produced during exposure is developed. In the second step, the image dye associated with the silver is bleached, corresponding to the actual imagewise distribution of the silver. The third step is necessary in order to reoxidise the excess image silver which is still present after the dye bleaching step. In the fourth step, the silver which is now present completely in the form of halides is removed by dissolving it out by means of a complexing agent, in particular a salt of thiosulfuric acid, in order to make the finished image insensitive to further exposure and to remove turbidity from the pure colour image.

In the conventional known processes, the second process step, namely dye bleaching, is carried out in a strongly acid medium, a catalyst being added in order to accelerate the dye bleaching. Additionally, the bleach baths contain a silver-complexing agent or a ligand. Both these constituents, the catalyst and the ligand, are necessary in order to transfer the reducing action of the metallic, non-diffusible image silver to the likewise non-diffusible dye. The reduced form of the catalyst, formed by reduction on the image silver, here functions as an intermediate carrier which, after covering a certain diffusion distance, irreversibly reduces and hence bleaches the dye and, at the same time, is itself reoxidised to the original form.

The property of the reduced stage of the bleach catalyst of freely diffusing between the image silver and the dye which is to be bleached enables the silver and the image dye to be spatially separated to a certain extent; in other words, the bleachable dye and the silver halide emulsion associated with it need not, or only partially, be located in the same layer and can, instead, be located in adjacent layers. Silver dye bleach materials of this type have been described, for example, in German Offenlegungsschriften Nos. 2,036,918, 2,132,835 and 2,132,836.

A simplification of the processing method, in which dye bleaching and silver bleaching are combined in a single process step, has been described in German Offenlegungsschrift No. 2,448,433.

The combined dye and silver bleach baths (formulations) for the processing of the exposed silver dye bleach material contain the components (a) to (e) and, if necessary, (f):

(a) strong acid,
(b) water-soluble iodide,
(c) water-soluble oxidising agent,
(d) an anti-oxidising agent,
(e) a bleach catalyst and
(f) a bleach accelerator.

The quantity of bleach catalysts used in the preferably aqueous treatment baths can vary within wide limits and is about 0.05 to 10 g/l of bleach bath.

The temperature of the bleach bath is in general between 20° and 90° C., preferably between 20° and 60° C., the required processing time at a higher temperature of course being shorter than that at a lower temperature. The bleach baths are stable within the temperature indicated. In general, the aqueous bleach formulations required for processing are used in the form of dilute aqueous solutions which contain the components mentioned. Other methods are, however, also conceivable, for example the use in the form of a paste.

This temperature range also applies to the other processing steps. The aqueous bleach formulation according to the present invention can be prepared, for example, from liquid, in particular aqueous concentrates of individual components or all the components ((a) to (f)). For example, two liquid concentrates are advantageously used, of which one contains strong acid (a) and the oxidising agent (c) and the other contains the remaining components (b), (d), (e) and, optionally (f); to improve the solubility, especially that of component (e), an additional solvent, such as ethyl alcohol or propyl alcohol, benzyl alcohol, ethylene glycol methyl ether or ethylene glycol ethyl ether, can be added to the latter concentrate. These concentrates (partial concentrates) which are also a subject of the present invention, have excellent stability and can therefore be stored for prolonged periods. These concentrates can be diluted as appropriate by dilution with water or with a mixture of water and an organic solvent and can be used in the process according to the invention. The aqueous bleach formulations used contain as a rule the following quantities of components (a) to (f):

(a) strong acid: 10 to 200 g/l,
(b) water-soluble iodide: 2 to 50 g/l, preferably 5 to 25 g/l,
(c) water-soluble oxidising agent: 1 to 30 g/l,
(d) anti-oxidising agent: 0.5 to 10 g/l,
(e) bleach catalysts: 0.05 to 10 g/l and, optionally
(f) bleach accelerator: 1 to 5 g/l.

The concentrates of the individual components or all the components or their combinations, for example of components (a) and (c) and of components (b), (d), (e) and (f) can contain, per liter of concentrated formulation 2 to 20 times, preferably 5 to 10 times, the quantity of the individual components, which was indicated above for the ready-to-use bleach baths. As a rule, the concentrates are in the form of a liquid or paste.

The strong acids (component (a)) contained in the combined dye bleach and silver bleach baths can be alkylsulfonic acids or arylsulfonic acids and, in particular, p-toluenesulfonic acid, sulfuric acid, sulfamic acid or trichloroacetic acid. It is also possible to use mixtures of these acids. The pH value of the bleach bath is in particular less than 2 and preferably less than 1.

The water-soluble iodides (component (b)) are as a rule alkali metal iodides, in particular sodium iodide and potassium iodide.

The oxidising agents (c) used are advantageously water-soluble aromatic mononitro compounds and dinitro compounds, or anthraquinonesulfonic acid derivatives. The use of such oxidising agents serves to influence the colour balance and the contrast of the images produced by the dye bleach process and is known from German Patent Specification No. 735,672, British Patent Specifications Nos. 539,190 and 539,509, and Japanese Patent Publication No. 22,673/69.

The mononitro and dinitro compounds preferably are mononitro- or dinitro-benzenesulfonic acids, for example those of the formula

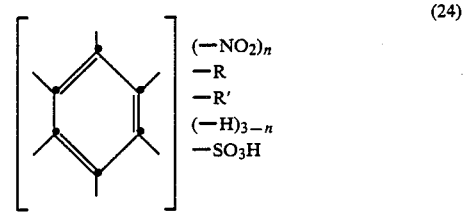

(24)

in which n is 1 or 2, and R and R' are hydrogen, lower alkyl having 1 to 4 carbon atoms, alkoxy, amino, hydroxyl or halogen (chlorine or bromine). The sulfonic acids can be added as the readily soluble salts. For example, the sodium or potassium salts of the following acids are suitable: o-nitrobenzenesulfonic acid, m-nitrobenzenesulfonic acid, 2,4-dinitrobenzenesulfonic acid, 3,5-dinitrobenzenesulfonic acid, 3-nitro-4-chlorobenzenesulfonic acid, 2-chloro-5-nitrobenzenesulfonic acid, 4-methyl-3,5-dinitrobenzenesulfonic acid, 3-chloro-2,5-dinitro-benzenesulfonic acid, 2-amino-4-nitrobenzenesulfonic acid, 2-amino-4-nitro-5-methoxybenzenesulfonic acid and 4-nitrophenyl-2-hydroxybenzenesulfonic acid.

In addition to their function as a silver bleaching agent, the compounds of component (c) also serve for lowering the gradation.

Advantageously, the anti-oxidising agents (anticorrosion agents) (d) used are reductones or water-soluble mercapto compounds. Suitable reductones are in particular aci-reductones having a 3-carbonyl-1,2-diol grouping, such as reductone, triose-reductone or preferably ascorbic acid. Examples of possible mercapto compounds are thioglycerol, in particular compounds of the formula

HS—C$_q$H$_{2q}$—B or preferably (25)

HS—(CH$_2$)$_m$—COOH (26)

in which q is an integer having a value from 2 to 12, B is a sulfonic acid or carboxylic acid group and m is one of the numbers 3 and 4. Mercapto compounds which can be used as anti-oxidising agents are described in German Offenlegungsschriften Nos. 2,258,076 and 2,423,814. Further suitable anti-oxidising agents are the alkali metal, alkaline earth metal or ammonium bisulfite adducts of organic carbonyl compounds, preferably alkali metal or ammonium bisulfite adducts of monoaldehydes having 1 to 4 carbon atoms or dialdehydes having 2 to 5 carbon atoms (German Offenlegungsschrift No. 2,737,142).

Examples which may be mentioned are the formaldehyde-bisulfite adduct which is particularly preferred, and also the corresponding adducts of acetaldehyde, propionaldehyde, butyraldehyde or isobutyraldehyde, and those of glyoxal, malonic dialdehyde or glutaric dialdehyde. Optionally, the following tertiary water-soluble phosphines, termed bleach accelerators, can also be employed simultaneously as the anti-oxidising agents.

Examples of suitable bleach accelerators (f) are quaternary ammonium salts, such as those known from German Offenlegungsschriften Nos. 2,139,401 and 2,716,136. Preferably these are quaternary, substituted or unsubstituted piperidine, piperazine, pyrazine, quinoline or pyridine compounds, the latter being preferred. It is also possible to use tetraalkylammonium compounds (alkyl having 1 to 4 carbon atoms) and alkylenediammonium compounds (alkylene having 2 to 6 carbon atoms). Specific compounds are: tetraethylammonium iodide,

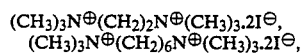
(CH$_3$)$_3$N$^\oplus$(CH$_2$)$_2$N$^\oplus$(CH$_3$)$_3$.2I$^\ominus$,
(CH$_3$)$_3$N$^\oplus$(CH$_2$)$_6$N$^\oplus$(CH$_3$)$_3$.2I$^\ominus$, N-methylpyridinium iodide, N-methylquinolinium iodide, N-hydroxyethylpyridinium chloride, N-hydroxypropylpyridinium bromide, N-methyl-2-hydroxymethylpyridinium iodide, N,N-dimethylpiperidinium iodide, N,N'-dimethylpyrazinium fluorosulfate and γ-picolinium bisulfate.

Further bleach accelerators are the water-soluble tertiary phosphines which are known from German Offenlegungsschrift No. 2,651,969 and which preferably contain at least one cyanoethyl grouping.

They are, for example, of the formula

$$X-P\begin{matrix}Y\\W\end{matrix} \quad (27)$$

in which W is —C$_r$H$_{2r}$CN, —C$_r$H$_{2r}$NO$_2$, a substituted or unsubstututed aryl radical or a heterocyclic radical, r is 1 to 25, X is substituted or unsubstituted alkyl and Y is hydroxyalkyl, alkoxyalkyl, sulfoalkyl, aminoalkyl (alkyl in each case having 1 to 25, preferably 2 to 4, carbon atoms), phenyl, sulfophenyl or pyridyl. Preferred tertiary phosphines are of the formula

$$X_1-P\begin{matrix}Y_1\\W_1\end{matrix} \quad (28)$$

in which X$_1$ is —CH$_2$CH$_2$CN or —(CH$_2$)$_2$OCH$_3$, Y$_1$ is —(CH$_2$)$_2$SO$_3^\ominus$M$^\oplus$, —(CH$_2$)$_3$—SO$_3^\oplus$M$^\ominus$, —(CH$_2$)$_4$—SO$_3^\ominus$M$^\oplus$, —(CH$_2$)$_2$OCH$_3$ or —CH$_2$N(C$_2$H$_5$)$_2$, W$_1$ is —CH$_2$CH$_2$CN or phenyl and M+ is a cation, in particular an alkali metal cation, for example the sodium or potassium cation.

Specific compounds are the following: bis-(β-cyanoethyl)-2-sulfoethylphosphine (sodium salt), bis-(β-cyanoethyl)-3-sulfopropylphosphine (sodium salt), bis-(β-cyanoethyl)-4-sulfobutylphosphine (sodium salt), bis-(β-cyanoethyl)-2-methoxyethylphosphine, bis-(2-methoxyethyl)-(β-cyanoethyl)-phosphine, (β-cyanoethyl)-phenyl-3-sulfopropylphosphine (sodium salt), (β-cyanoethyl)-phenyl-2-methoxyethylphosphine and bis-(2-methoxyethyl)-phenylphosphine.

A repeat of individual treatments (each time in a further tank with a bath having the same composition as the preceding bath) is possible; in some cases, better bath utilisation can be achieved in this way. If permitted by the number of available tanks and by the time programme, water baths can also be inserted between baths having different actions. It is up to the expert to determine the optimum quantity from the sensitometric results, depending on the type of catalysts selected. All the baths can contain further conventional additives, for example hardeners, wetting agents, fluorescent brighteners or UV stabilisers.

Baths of conventional composition can be used for the silver development, for example those which, as the developer substance, contain hydroquinone and, optionally, additionally 1-phenyl-3-pyrazolidinone. In some cases, the silver developing bath already contains a bleach catalyst.

The silver fixing bath can have the known and conventional composition. The fixer used is, for example, sodium thiosulfate or, with advantage, ammonium thiosulfate, optionally with additions such as sodium bisulfite and/or sodium metabisulfite.

EXAMPLE 1

Preparation of the dye of the formula

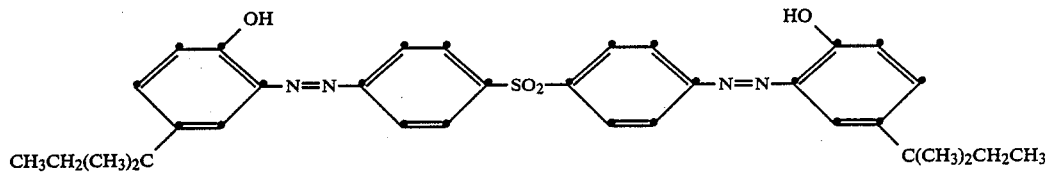

1.25 g (0.005 mol) of 4,4'-diamino-diphenylsulfone are dissolved in 75 ml of water in the presence of 3.6 g of concentrated hydrochloric acid. A solution of 0.72 g (10.5 mmols) of sodium nitrite in 10 ml of water is added dropwise at 5° C. The solution is stirred for one hour at 5° C. The resulting solution of the diazonium salt is added, at 5° C., to a mixture of 1.64 g (0.01 mol) of p-tert.-amylphenol and a solution of 4.25 g of sodium carbonate in 250 ml of 65% ethanol. The mixture is stirred for 2 hours, and the precipitate is filtered off with suction. After purification by chromatography on silica gel with chloroform (99 parts) and ethyl acetate (1 part), this gives 2 g (67%) of the yellow dye having a melting point of 165° to 167° C. $\lambda_{max}^{CH3Cl3}=423$ nm, $\lambda_{max}^{gelatine}=419$ nm.

EXAMPLE 2

Preparation of the dye of the formula

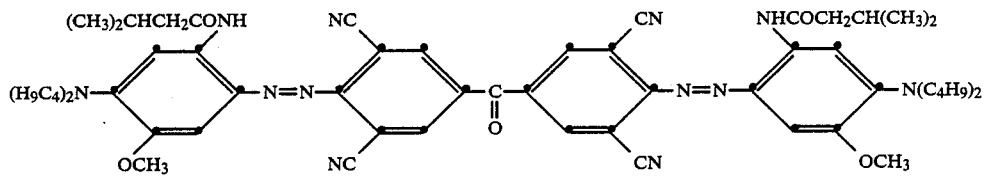

(a) Diazo component

(a₁) Bis-4,4'-acetamido-diphenylmethane 109.5 g (0.55 mol) of 4,4-diamino-diphenylmethane are dissolved in 800 ml of toluene. 112.3 g (1.10 mols) of acetic anhydride are added to this solution. The resulting suspension is boiled under reflux for 4 hours. The mixture is then allowed to cool, and the precipitate is filtered off with suction and dried at 70° C. in vacuo. The yield is 146 g (90%) and the melting point is 225° to 226° C.

(a₂) Bis-4,4'-acetamido-benzophenone 28.0 g (0.10 mol) of bis-4,4'-acetamido-diphenylmethane are suspended in 250 ml of acetic acid. 27.5 g (0.26 mol) of CrO₃ are added in portions at 60° C. The mixture is stirred for 2 hours at this temperature and for a further 2 hours at 90° C. The resulting solution is poured into 3 l of ice-water. The precipitate formed is filtered off with suction and washed with water. The crude product is dissolved in 100 ml of acetone. After insoluble fractions have been separated off, the solution is stirred into 500 ml of water. The precipitate formed is filtered with suction and dried at 70° C. in vacuo. The yield is 20.0 g (67.5%), and the melting point is 230° to 232° C.

(a₃) 4,4'-Diamino-benzophenone 15.0 g (0.05 mol) of bis-4,4'-acetamido-benzophenone are boiled under reflux for 3 hours in 75 g of concentrated hydrochloric acid and 75 g of water. The mixture is diluted with 500 ml of water and neutralised with 30% sodium hydroxide solution. The precipitate formed is filtered off with suction, washed with water and dried at 60° C. in vacuo. The yield is 10.0 g (93%), and the melting point is 238° to 240° C.

(a₄) 4,4'-Diamino-2,2',6,6'-tetrabromo-benzophenone 2.12 g (0.01 mol) of 4,4'-diamino-benzophenone are suspended in 100 ml of 2-methoxyethanol in the presence of 3 g of concentrated hydrochloric acid. A solution of 12 g (0.075 mol) of bromine, 2 g of sodium bromide and 20 ml of methanol is added dropwise. The reaction mixture is stirred for 2 hours and then poured into 300 ml of water. The excess bromine is destroyed by adding sodium sulfite. The precipitate formed is filtered off with suction, washed with water and then with methanol, and dried at 60° C. in vacuo. The yield is 4.8 g (90%), and the melting point is 241° to 243° C. (decomposition).

(b) Coupling component

Preparation of 2-methoxy-5-isovalerylamido-N,N-dibutylaniline 13.35 g (0.06 mol) of 2-amino-4-isovalerylamidoanisole are dissolved under nitrogen in 200 ml of N,N-dimethylacetamide. 10 g (0.25 mol) of magnesium oxide and 27.4 g (0.2 mol) of butyl bromide are added. The mixture is heated at 130° C. for six hours and finally cooled down. The suspension is filtered with suction, and the filtrate is poured into 100 ml of ice-water. The precipitate is filtered off with suction, and the crude product is recrystallised from 40 ml of acetonitrile in the presence of animal charcoal. This gives 16.0 g (80%) of 2-methoxy-5-isovalerylamido-N,N-dibutylaniline having a melting point of 88° to 90° C.

The nuclear magnetic resonance spectrum (in CDCl₃) and the elementary analysis confirm the chemical structure of the coupling component.

(c) Preparation of the azo dye of the formula

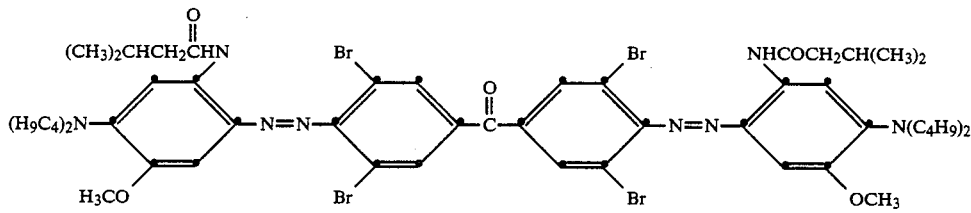

0.30 g of methanesulfonic acid and then 0.22 g of nitrosylsulfuric acid are added to 0.37 g (0.7 mmol) of 4,4'-diamino-2,2',6,6'-tetrabromo-benzophenone in 25 ml of acetic acid. After stirring for 90 minutes at room temperature, the diazonium suspension is introduced into a mixture of 0.5 g of 2-methoxy-5-isovalerylamido-N,N-dibutylaniline, 30 ml of N,N-dimethylformamide, 30 ml of acetic acid and 1.0 g of sodium acetate. The reaction mixture is stirred for two hours at 15° C. and poured into 150 ml of ice-water. The precipitate is filtered off with suction, dissolved in chloroform and dried over magnesium sulfate. After evaporation of the solvent, the oily residue is eluted from silica gel with a mixture of chloroform (97 parts) and hexane (1 part).

The yield of magenta dye is 0.37 g (43%) $\lambda_{max}^{CHCl_3} = 532$ nm ($\epsilon = 44,700$).

(d) Preparation of the azo dye of the formula

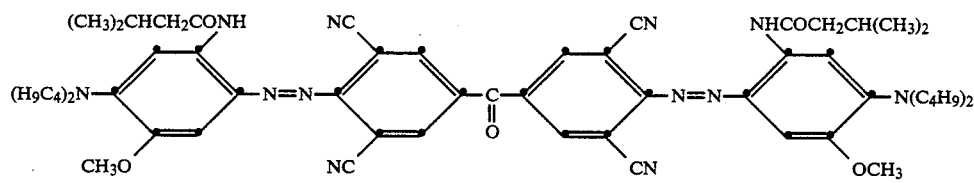

0.1 g of copper(I) cyanide and 0.7 g of zinc cyanide are added to 0.45 g (0.37 mmol) of the dye, prepared under (c), in 30 ml of N-methylpyrrolidone. The mixture is stirred for 20 hours at 120° C. and introduced into 50 ml of 10% sodium chloride solution. The precipitate is filtered off with suction, washed with water and dried. The residue is eluted from silica gel with a mixture of hexane (8 parts) and pyridine (2 parts). The yield of cyan dye is 0.15 g (40%). $\lambda_{max}^{CHCl_3} = 677$ nm ($\epsilon = 154,000$) $\lambda_{max}^{gelatine} = 634$ nm. The dyes are listed in Table 3 are prepared in an analogous manner.

TABLE 3

| | $X_1$ | $Y_1$ | $Z_1$ | $R_1$ | $R_2$ | $W_1$ | $R_3$ | $R_4$ | $\lambda_{max}^{CHCl_3}$ | $\epsilon_{mol}$ | $\lambda_{max}^{Gel.}$ |
|---|---|---|---|---|---|---|---|---|---|---|---|
| 101 | NHCOCH₂CH(CH₃)₂ | N(C₄H₉)₂ | OCH₃ | H | H | H | H | —CH=CH— | 551 | 83,200 | 552 |
| 102 | " | " | OCH₃ | Br | Br | H | H | —SO₂— | 528 | 49,800 | 545 |
| 103 | " | " | OCH₃ | CN | CN | H | H | —SO₂— | 675 | 14,6000 | 615 |
| 104 | " | " | OCH₃ | CN | CN | H | H | —CO— | 677 | 15,4000 | 634 |
| 105 | " | N(CH₃)₂ | H | H | H | H | H | —SO₂— | 499 | 76,800 | 478 |
| 106 | NHPO(OC₂H₅)₂ | NHCH₂CH(CH₃)₂ | OCH₃ | CN | CN | H | CH₃ | —CH₂CH₂— | 575 | 93,800 | 588 |
| 107 | NHPO(OC₄H₉)₂ | NHC₂H₄CN | H | Br | Br | H | CH₃ | —CH₂CH₂— | 394 | 46,700 | 400 |
| 108 | NHPO(OC₄H₉)₂ | NHCHCH₂OCH₃ / CH₃ | OCH₃ | CN | CN | H | CH₃ | —CH₂CH₂— | 573 | 87,700 | 594 |
| 109 | " | N(C₂H₅)₂ | OCH₃ | CN | CN | H | H | —SO₂— | 639 | 120,000 | 630 |
| 110 | " | N(C₂H₅)₂ | OCH₃ | CN | CN | H | H | —CO— | 626 | 96,300 | 625 |
| 111 | " | N(C₂H₅)₂ | OCH₃ | CN | NO₂ | H | H | — | 662 | 95,000 | 640 |
| 112 | NHCOCH₂(CH₃)₂ | N(C₄H₉)₂ | OCH₃ | Br | Br | H | H | —SO₂— | 638 | 136,000 | 630 |
| 113 | " | N(C₄H₉)₂ | OCH₃ | CN | CN | H | H | — | 526 | 58,200 | 543 |
| 114 | " | N(C₄H₉)₂ | OCH₃ | CN | CN | H | H | — | 679 | 157,000 | 625 |
| 115 | OH | H | NHCOCH(C₂H₅)(C₄H₉) | H | H | H | H | —O— | 413 | 17,100 | 439 |
| 116 | OH | H | NCOCH(C₂H₅)(C₄H₉) / CH₃ | H | H | H | H | —O— | 403 | 26,700 | 399 |
| 117 | OH | H | " | H | H | H | H | —CH=CH— | 456 | 43,100 | 460 |
| 118 | OH | H | CH₂CO₂CH₂CH(CH₃)(CH₃) | H | H | H | H | —CH=CH— | 450 | 53,800 | 440 |
| 119 | OH | H | CH₂CO₂(C₂H₄O)₂CH₃ | H | H | H | H | —SO₂— | 413 | 18,100 | 403 |
| 120 | OH | H | O(C₂H₄O)₂CH₃ | H | H | H | H | —SO₂— | 467 | 14,900 | 445 |
| 121 | OH | H | O(C₂H₄O)₂CH₃ | H | H | H | H | —O— | 439 | 18,700 | 442 |
| 122 | OH | H | OCH₂CH(CH₃)₂ | H | H | H | H | —CO— | 464 | 17,100 | 465 |
| 123 | OH | H | " | H | H | H | H | —SO₂— | 473 | 15,200 | 462 |
| 124 | OH | H | C(CH₃)₂CH₂CH₃ | H | H | H | H | —O— | 445 | 16,200 | 445 |
| 125 | OH | H | " | H | H | H | H | —SO₂— | 423 | 17,500 | 419 |
| 126 | OH | H | " | H | H | H | H | —CO— | 417 | 19,100 | 415 |
| 127 | OH | H | CH₃ | H | H | H | H | —CH=CH— | 456 | 52,100 | 435 |
| 128 | OH | OCH₂CH₂CH(CH₃)₂ | | H | H | H | H | —O— | 430 | 40,800 | 420 |

TABLE 3-continued

| | $X_1$ | $Y_1$ | $Z_1$ | $R_1$ | $R_2$ | $W_1$ | $R_3$ | $R_4$ | $\lambda_{max}^{CHCl_3}$ | $\epsilon_{mol}$ | $\lambda_{max}^{Gel.}$ |
|---|---|---|---|---|---|---|---|---|---|---|---|
| 129 | OH | OC$_2$H$_4$OC$_4$H$_9$ | CH$_3$ | H | H | H | H | —O— | 425 | 37,200 | 420 |
| 130 | OH | OC$_2$H$_4$OC$_2$H$_4$OCH$_3$ | CH$_3$ | H | H | H | H | —O— | 425 | 38,200 | 432 |
| 131 | OH | OCH$_3$ | NHCOCH$_2$CH(CH$_3$)$_2$ | H | H | H | H | —O— | 443 | 32,400 | 430 |
| 132 | OH | OC$_3$H$_7$ | CH$_3$ | H | H | H | H | —SO$_2$— | 455 | 36,700 | 401 |
| 133 | OH | OC$_3$H$_7$ | CH$_3$ | H | H | CH$_3$ | H | —SO$_2$— | 433 | 38,500 | 425 |
| 134 | OH | H | CH$_2$CO$_2$CH$_2$CH(CH$_3$)$_2$ | H | H | H | H | —SO$_2$— | 412 | 18,800 | 405 |
| 135 | OH | H | C(CH$_3$)$_3$ | H | H | H | H | —SO$_2$— | 435 | 13,300 | 430 |
| 136 | NHCOC$_2$H$_5$ | NHCHCH$_2$OCH$_3$ \| CH$_3$ | OC$_2$H$_4$OCH$_3$ | H | H | H | H | —CO— | 525 | 54,400 | 526 |
| 137 | NHCOC$_2$H$_5$ | NHCHCH$_2$OCH$_3$ \| CH$_3$ | OC$_2$H$_4$OCH$_3$ | Br | H | H | H | —SO$_2$— | 541 | 39,400 | 539 |
| 138 | NHCOC$_2$H$_5$ | NHCHCH$_2$OCH$_3$ \| CH$_3$ | OC$_2$H$_4$OCH$_3$ | Br | H | H | H | —CO— | 543 | 53,800 | 545 |
| 139 | NHCOC$_2$H$_5$ | NHCHCH$_2$OCH$_3$ \| CH$_3$ | OC$_2$H$_4$OCH$_3$ | Cl | H | H | H | —SO$_2$— | 547 | 48,100 | 544 |
| 140 | NHCOC$_2$H$_5$ | N(C$_2$H$_5$)$_2$ | OC$_2$H$_4$OCH$_3$ | H | H | H | H | —SO$_2$— | 538 | 44,800 | 536 |
| 141 | NHCOCH$_2$CH(CH$_3$)$_2$ | N(C$_2$H$_5$)$_2$ | OC$_2$H$_4$OCH$_3$ | H | H | H | H | —CO— | 574 | 42,600 | 539 |
| 142 | NHCOCH$_2$CH(CH$_3$)$_2$ | NHC$_4$H$_9$ | OCH$_3$ | H | H | H | H | —CO— | 532 | 58,500 | 527 |
| 143 | NHCOCH$_2$CH(CH$_3$)$_2$ | NHC$_4$H$_9$ | OCH$_3$ | Br | H | H | H | —SO$_2$— | 549 | 41,900 | 557 |
| 144 | NHPO(OC$_2$H$_5$)$_2$ | NHCHCH$_2$CH(CH$_3$)$_2$ \| CH$_3$ | OCH$_3$ | H | H | H | H | —CH=CH— | 534 | 64,200 | 539 |
| 145 | NHPO(OC$_2$H$_5$)$_2$ | NHCHCH$_2$CH(CH$_3$)$_2$ \| CH$_3$ | OCH$_3$ | Br | H | H | H | —SO$_2$— | 549 | 66,000 | — |
| 146 | NHPO(OC$_4$H$_9$)$_2$ | N(C$_2$H$_5$)$_2$ | OCH$_3$ | H | H | H | H | —SO$_2$— | 522 | 44,300 | 526 |
| 147 | NHPO(OC$_2$H$_5$)$_2$ | NHCHCH$_2$CH(CH$_3$)$_2$ | OCH$_3$ | H | H | H | H | —CO— | 521 | 48,700 | 526 |
| 48 | NHPO(OC$_2$H$_5$)$_2$ | (CH$_3$)$_2$CHCH$_2$CHNH \| CH$_3$ | OCH$_3$ | H | H | H | CH$_2$ | — | 532 | 50,100 | 537/564 |
| 149 | NHPO(OC$_2$H$_5$)$_2$ | (CH$_3$)$_2$CHCH$_2$CH—NH \| CH$_3$ | OCH$_3$ | H | H | H | CO | — | 550 | 37,900 | 554 |

EXAMPLE 3

20.2 mg of the dye of the formula

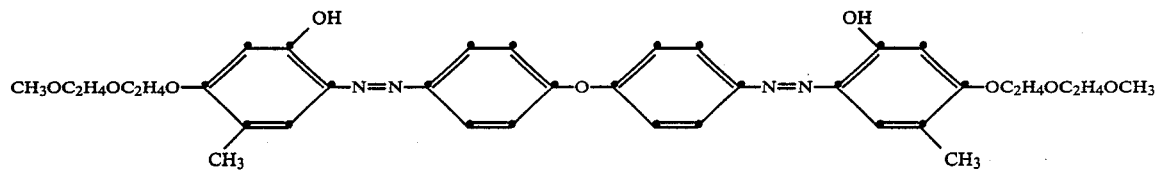

are dissolved in 2 ml of a mixture of ethyl acetate and tricresyl phosphate (mixing ratio 9:1) and the solution is added to a mixture of 6.6 ml of 6% aqueous gelatine solution, 0.9 ml of distilled water and 0.5 ml of an 8% solution of the sodium salt of dibutylnaphthalenesulfonic acid, and the mixture is emulsified by means of ultrasonics.

2.5 ml of the emulsion obtained are mixed with 5 ml of water, 1.5 ml of a non-sensitised gelatine silver bromide/iodide emulsion which contains about 22 g of silver/kg of gelatine, 1 ml of 4% gelatine solution and 1 ml of a 1% solution of a hardener of the formula

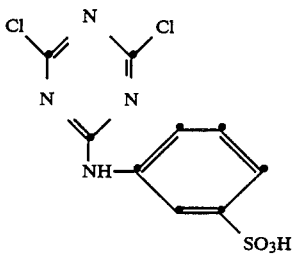

This mixture is coated onto an opaque triacetate base (13×18 cm size) and dried. The light-sensitive material thus obtained is exposed behind a step wedge and processed at 24° C. as follows:

| | |
|---|---|
| Developing | 6 minutes |
| Washing | 4 " |
| Silver and dye bleach | 6 " |
| Washing | 2 " |
| Fixing | 8 " |
| Washing | 6 " |
| Drying. | |

The developing and fixing baths are conventional baths, as used in black-and-white photography. The silver dye bleach bath has the following composition, per liter of solution:

| | |
|---|---|
| Sulfamic acid | 100 g |
| m-Nitrobenzenesulfonic acid | 10 g |
| Potassium iodide | 6 g |
| 2,3,6-Trimethylquinoxaline | 2 g |
| 4-Mercaptobutyric acid | 1 g |

This gives a counter-imagewise yellow wedge which is bleached completely white in the area of the originally highest silver density. The image is distinguished by high brillance and light fastness.

EXAMPLE 4

11.4 mg of the dye of the formula

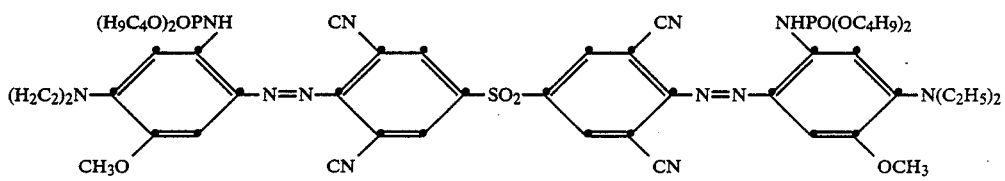

are dissolved in 2 ml of a mixture (mixing ratio 9:1) of ethyl acetate and tricresyl phosphate.

This mixture is emulsified with 7 ml of 5% gelatine solution and 0.5 ml of 8% aqueous solution of the sodium salt of dibutylnaphthalenesulfonic acid to give a homogeneous mixture. 5 ml of water, 0.5 ml of a non-sensitised gelatine silver bromide emulsion which contains about 22 g of silver per kg of gelatine, 2.0 ml of 4% gelatine solution and 1 ml of 1% hardener solution are added to 2.5 ml of this dye emulsion. This mixture is coated onto a 13×18 cm opaque triacetate sheet and dried. The light-sensitive material thus obtained is exposed with white light behind a step wedge and processed at 30° C. as follows:

| | |
|---|---|
| Developing | 3 minutes |
| Washing | 1 " |
| Silver and dye bleaching | 5 " |
| Washing | 1 " |
| Fixing | 4 " |
| Washing | 6 " |
| Drying. | |

The developer bath has the following composition, per liter of solution:

| | |
|---|---|
| Sodium sulfate | 50 g |
| 1-Phenyl-3-pyrazolidone | 0.2 g |
| Hydroquinone | 6 g |
| Sodium carbonate | 35 g |
| Potassium bromide | 4 g |
| Benzotriazole | 0.3 g. |

The silver dye bleach bath has the following composition, per liter of solution:

| | |
|---|---|
| Concentrated sulfuric acid | 28 ml |
| m-Nitrobenzenesulfonic acid (sodium salt) | 10 g |

| -continued | |
|---|---|
| Potassium iodide | 6 g |
| Bis-(2-cyanoethyl)-(2-sulfoethyl)-phosphine (sodium salt) | 3 g |
| 2,3-Dimethylquinoxaline | 1.5 g. |

The fixing bath contains, per liter of solution:

| Sodium thiosulfate | 200 g |
|---|---|
| Sodium metabisulfite | 20 g. |

This gives a brilliant, light-fast cyan wedge which is bleached completely white in the areas of the originally highest silver density.

What is claimed is:

1. A compound of the formula

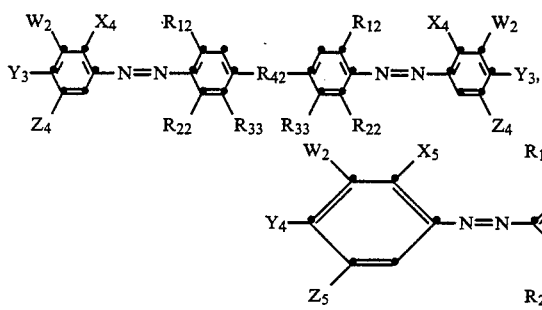

in which $X_4$ is —NHCOM$_{12}$ or —NHP(O)(OG$_{12}$)$_2$, in which M$_{12}$ is alkyl having 1 to 16 carbon atoms, which is unsubstituted or substituted by carbalkoxy having 2 to 5 carbon atoms or by methoxy or ethoxy, and in which G$_{12}$ is alkyl having 1 to 4 carbon atoms, or X$_4$ is hydroxyl, Z$_4$ is hydrogen, alkyl or alkoxy having 1 to 8 carbon atoms or —CH$_2$CO$_2$R$_{53}$, in which R$_{53}$ is alkyl having 1 to 4 carbon atoms, —C$_2$H$_4$O)$_2$—CH$_3$ or —C$_2$H$_4$O—CH$_3$, or Z$_4$ is —(OC$_2$H$_4$)n$_2$—OU$_{12}$ or —NL$_{21}$COM$_{32}$, in which U$_{12}$ is hydrogen or alkyl having 1 to 4 carbon atoms, n$_2$ is 1 or 2, L 21 is hydrogen or alkyl having 1 to 4 carbon atoms and M$_{32}$ is alkyl having 1 to 8 carbon atoms, R$_{33}$ is hydrogen or methyl or, if R$_{42}$ is a direct chemical bond, the two radicals R$_{33}$ are hydrogen or methyl or form together a link member of the formula —CH$_2$— or —CO—, W$_2$ is hydrogen or methyl, Y$_3$ is N-alkylsubstituted or N,N-dialkylsubstituted amino, the alkyl moieties each containing 1 to 8 carbon atoms and being unsubstituted or substituted by methoxy, ethoxy, acetoxy, hydroxyl or cyano, or Y$_3$ is —NHCOM$_{22}$, in which M$_{22}$ is alkyl having 1 to 4 carbon atoms, methoxy or —O—(C$_2$H$_4$O)—n$_2$—CH$_3$, in which n$_2$ is 1 or 2, R$_{12}$ and R$_{22}$ independently of one another are hydrogen, chlorine, bromine, cyano, nitro or methylsulfone, R$_{42}$ is a direct chemical bond, or a link member of the formula —O—, —CO—, —SO$_2$—, —(CH$_2$)m$_2$—, in which m$_2$ is an integer from 1 to 6, or —CH=CH—, and at least one of the substituents W$_2$, Y$_3$ and Z$_4$ is other than hydrogen, and X$_4$ L is different from hydroxyl, if Z$_4$ is hydrogen, and Z$_4$ is different from methyl, tert.-butyl and 1-hexyl, if R$_{42}$ is the direct chemical bond, —O—, —CH$_2$— or —CH=CH—, or the compounds of the formula

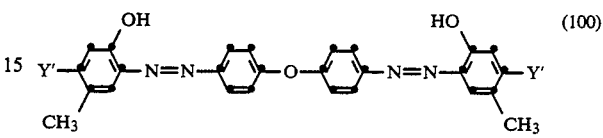

wherein Y' is —OC$_2$H$_4$CH(CH$_3$)$_2$, OC$_2$H$_4$OC$_4$H$_9$, —(OC$_2$H$_4$)$_2$OCH$_3$ or —OC$_3$H$_7$.

2. A compound according to claim 1, of the formula

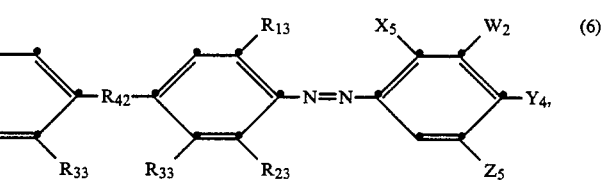

in which X$_5$ is —NHCOM$_{13}$, in which M$_3$ is alkyl having 1 to 16 carbon atoms, or —NHP(O)(OG$_{12}$)$_2$, in which G$_{12}$ is as defined above, or is hydroxyl, Y$_4$ is hydrogen, alkoxy having 1 to 8 carbon atoms or —(OC$_2$H$_4$)n$_2$—OU$_{13}$, in which U$_{13}$ is methyl or ethyl and n$_2$ is as defined above, or Y$_4$ is N-alkylsubstituted or N,N-dialkylsubstituted amino, the alkyl moieties each containing 1 to 8 carbon atoms and being unsubstituted or substituted by methoxy, ethoxy, hydroxyl or cyano, Z$_5$ is hydrogen, alkyl or alkoxy having 1 to 5 carbon atoms or —CH$_2$CO$_2$R$_{53}$, in which R$_{53}$ is as defined above, or Z$_5$ is —(OC$_2$H$_4$)$_2$—OCH$_3$, —(OC$_2$H$_4$)$_2$—OH, —OC$_2$H$_4$—OH, —OC$_2$H$_4$—OCH$_3$ or —N(CH$_3$)COM$_{32}$, in which M$_{32}$ is as defined above, R$_{13}$ and R$_{23}$ independently of one another are hydrogen, chlorine, bromine, cyano, nitro or methylsulfone, R$_{34}$ is hydrogen or methyl or, if R$_{42}$ is a direct chemical bond, the two radicals R$_{34}$ are hydrogen or methyl or together form a link member of the formula —CH$_2$— or —CO—, and W$_2$ and R$_{42}$ are as defined above, and at least one of the substituents W$_2$, Y$_4$ and Z$_5$ is other than hydrogen, and X$_5$ is different from hydroxyl, if Z$_5$ is hydrogen, and Z$_5$ is different from methyl or tert.-butyl, if R$_{42}$ is the direct chemical bond, —O—, —CH$_2$— or —CH=CH—, or the compounds of the formula (100).

3. A compound according to claim 2, of the formula

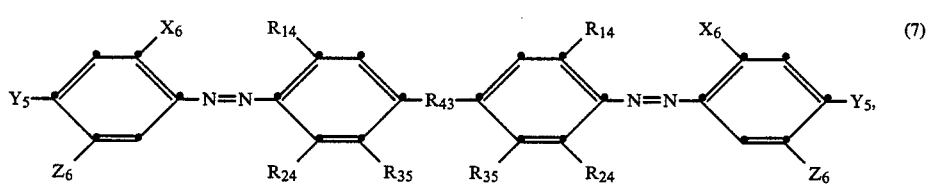

in which $X_6$ is —$NHCOM_{13}$ or —$NHP(O)(OG_{12})_2$, in which $M_{13}$ and $G_{12}$ are as defined above, $Y_5$ is N-alkyl-substituted or N,N-dialkylsubstituted amino, the alkyl moieties each containing 1 to 8 carbon atoms and being unsubstituted or substituted by methoxy or ethoxy, $Z_6$ is hydrogen, alkyl having 1 to 5 carbon atoms, —$(OC_2H_4)_2$—$OCH_3$, —$(OC_2H_4)_2$—$OH$, —$OC_2H_4OCH_3$ or —$OC_2H_4$—$OH$, $R_{14}$ and $R_{24}$ independently of one another are hydrogen, chlorine or bromine, $R_{35}$ is hydrogen or, if $R_{43}$ is a direct chemical bond, the two radicals $R_{35}$ are hydrogen or form together a link member of the formula —$CH_2$— or —CO—, and $R_{43}$ is a direct chemical bond or a link member of the formula —CO—, —$SO_2$— or —CH=CH—, and $X_6$ is different from hydroxyl, if $Z_6$ is hydrogen, and $Z_6$ is different from methyl or tert.-butyl, if $R_{43}$ is the direct chemical bond or —CH=CH—, or the compounds of the formula (100).

4. A compound according to claim 2, of the formula

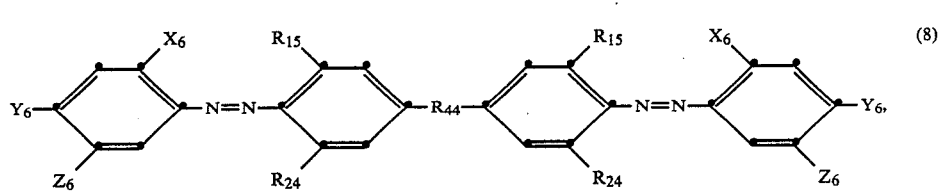

(8)

in which $Y_6$ is N,N-dialkylsubstituted amino, the alkyl moieties each containing 1 to 8 carbon atoms and being unsubstituted or substituted by methoxy, ethoxy or cyano, $R_{15}$ and $R_{24}$ independently of one another are cyano, nitro or methylsulfone, $R_{44}$ is a direct chemical bond or a link member of the formula —CO— or —$SO_2$— and $X_6$ and $Z_6$ are as defined above, and $X_6$ is different from hydroxyl, if $Z_6$ is hydrogen, and $Z_6$ is different from methyl or tert.-butyl, if $R_{43}$ is the direct chemical bond or —CH=CH—, or the compounds of the formula (100).

* * * * *

UNITED STATES PATENT AND TRADEMARK OFFICE
CERTIFICATE OF CORRECTION

PATENT NO. : 4,521,591

DATED : June 4, 1985

INVENTOR(S) : Jan et al.

It is certified that error appears in the above-identified patent and that said Letters Patent is hereby corrected as shown below:

| | |
|---|---|
| Col. 4, line 32 | After "$Z_1$ can" insert --also-- |
| Col. 4, line 42 | After "$H_4$" delete "9" and substitute --)-- |
| Col. 7, line 1 | After "ethoxy" insert --acetoxy-- |
| Col. 7, line 50 | After "$W_2$" insert --are as defined above, and at least one of the substituents $Y_3$, $Z_3$ and $W_2$-- |
| Col. 15, last line under "$X_1$" | Delete "$HNCOC_2H_4OC_2H_5$" and substitute --$NHCOC_2H_4OC_2H_5$-- |
| Col. 22, line 30 | Delete "$\oplus$ M $\ominus$" and substitute -- $\ominus$ M $\oplus$ -- |
| Col. 31, line 25 | Beginning of structure delete "$(H_2C_2)_2N$-" and substitute --$(H_5C_2)_2N$- -- |
| Col. 32, line 17 | Correct spelling of "brilliance" |
| Col. 34, line 7 | After "$X_4$" delete "L" |
| Col. 34, line 7 | The following words should not be italicized "is different from hydroxyl, if $Z_4$" |

UNITED STATES PATENT AND TRADEMARK OFFICE
CERTIFICATE OF CORRECTION

PATENT NO. : 4,521,591

DATED : June 4, 1985

INVENTOR(S) : Jan, et al.

It is certified that error appears in the above-identified patent and that said Letters Patent is hereby corrected as shown below:

Col. 35, line 16  Delete "$-OC_2H_4)_2$" and substitute $--(OC_2H_4)_2--$

Signed and Sealed this

Fifth Day of November 1985

[SEAL]

Attest:

*Attesting Officer*

DONALD J. QUIGG

*Commissioner of Patents and Trademarks*